United States Patent
Ono et al.

(10) Patent No.: US 6,317,432 B1
(45) Date of Patent: *Nov. 13, 2001

(54) SHORT-CELL MULTIPLEXING DEVICE

(75) Inventors: Hideaki Ono; Ryuichi Takechi; Tsuguo Kato, all of Kanagawa; Hiroshi Sasaki; Takayuki Sasaki, both of Miyagi, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/041,936

(22) Filed: Mar. 13, 1998

(30) Foreign Application Priority Data

Oct. 13, 1997 (JP) .................................................. 9-278500

(51) Int. Cl.⁷ ...................................................... H04L 12/28
(52) U.S. Cl. ............................ 370/395; 370/397; 370/409
(58) Field of Search ..................................... 370/389, 395, 370/394, 400, 409, 411, 412, 428, 471, 474, 535

(56) References Cited

U.S. PATENT DOCUMENTS

| 5,214,642 | * | 5/1993 | Kunimoto et al. ..................... 370/82 |
| 5,499,238 | * | 3/1996 | Shon .................................. 370/60.1 |
| 5,561,663 |  | 10/1996 | Klausmeier . |
| 5,638,364 | * | 6/1997 | Sugita .................................. 370/397 |
| 5,802,050 | * | 9/1998 | Petersen et al. ..................... 370/394 |
| 5,909,428 | * | 6/1999 | Saito et al. ......................... 370/244 |
| 5,936,967 | * | 8/1999 | Baldwin et al. ..................... 370/474 |
| 6,061,354 | * | 5/2000 | Morikawa et al. .................. 370/395 |

FOREIGN PATENT DOCUMENTS

| 0596624 | 5/1994 | (EP) . |
| 0766425 | 4/1997 | (EP) . |
| 7162437 | 6/1995 | (JP) . |
| 7202895 | 8/1995 | (JP) . |
| WO 96/34478 | 10/1996 | (WO) . |

OTHER PUBLICATIONS

Multirate Scheduling of VBR Video Traffic in ATM Networks XP 000694458.

* cited by examiner

Primary Examiner—Alpus H. Hsu
Assistant Examiner—Duc Ho
(74) Attorney, Agent, or Firm—Rosenman & Colin, LLP

(57) ABSTRACT

The quality classes of arriving short cells and the ATM virtual connections to be multiplexed are identified based on the CIDs of those short cells. Those short cells are written into FIFO memories corresponding to the ATM virtual connections and quality classes. A VC specification control section specifies one ATM virtual connection for each ATM cell sending timing. At this time, a sequence specification control section specifies one or more quality classes in sequence. A readout control section reads one or more short cells out from the FIFO memory in accordance with the specified ATM virtual connection and quality class, stores them in one ATM cell and sends the ATM cell to the ATM virtual connection specified by the VC specification control section.

26 Claims, 33 Drawing Sheets

A BAND RATIO IS SET FOR EACH ORDER OF PRIORITY CLASS
VC#1 BAND RATIO: 0.5
VC#2 BAND RATIO: 0.2
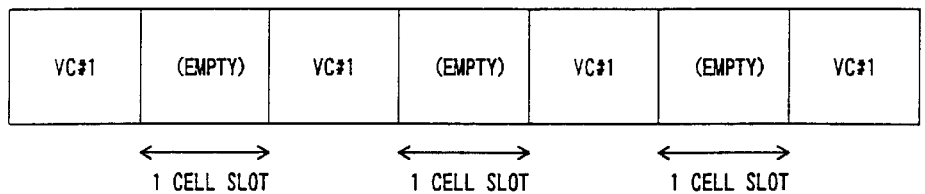
(EXAMPLE)
VC#1 CELL SENDING TIME    CELL INTERVAL=(1-0.5)/0.5=1 (1 CELL INTERVAL IS OPENED)
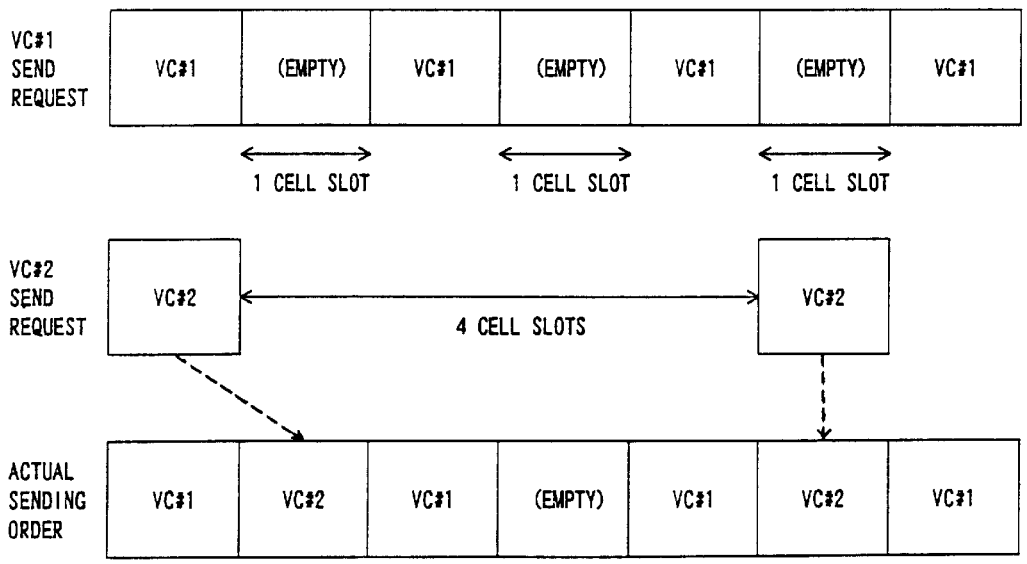
(EXAMPLE)
VC#2 CELL SENDING TIME    CELL INTERVAL=(1-0.2)/0.2=4 (4 CELL INTERVALS ARE OPENED)
FIG. 10

BYTE INTERVAL SETTING (IN UNITS OF BYTES)

BAND RATIO IS SET FOR EACH QUALITY CLASS
QUALITY CLASS 1 BAND RATIO: 0.5
QUALITY CLASS 2 BAND RATIO: 0.2

(EXAMPLE) CASE IN WHICH SHORT CELL LENGTH= 8 BYTES
CLASS 1 CELL SENDING TIME
BYTE INTERVAL= 8×(1−0.5)/0.5=8 (8-BYTE INTERVAL IS OPENED)

- READOUT PATTERN IN CASE IN WHICH ONLY SHORT CELLS OF CELL LENGTH 8 BYTES
  ARRIVE IN CLASS 1

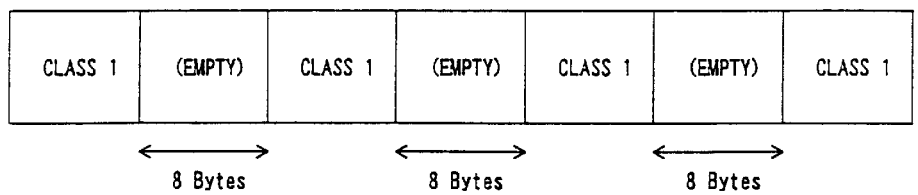

- READOUT PATTERN IN CASE IN WHICH ONLY SHORT CELLS OF CELL LENGTH 8 BYTES
  ARRIVE IN CLASS 1 AND CLASS 2

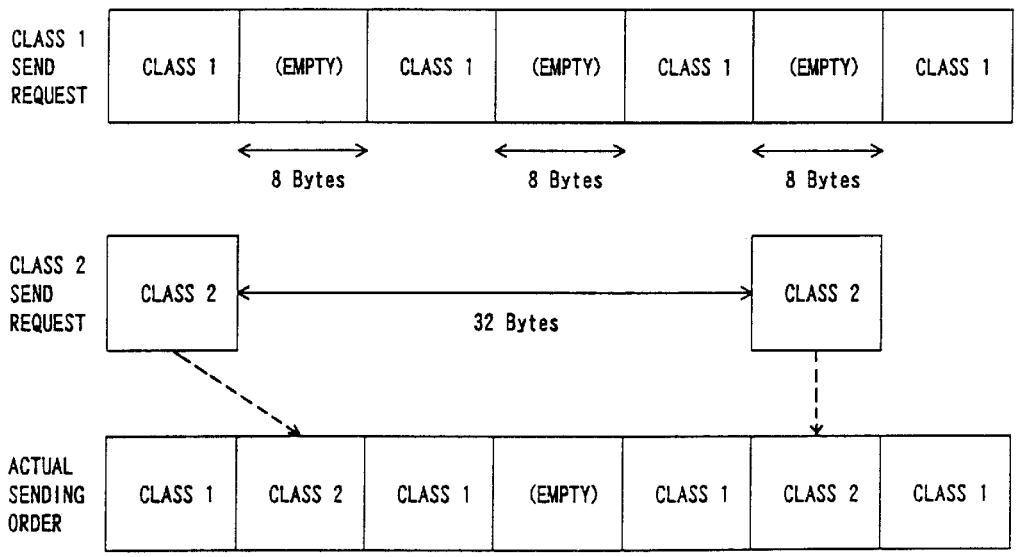

(EXAMPLE) CASE IN WHICH SHORT CELL LENGTH= 8 BYTES
CLASS 2 CELL SENDING TIME
BYTE INTERVAL= 8×(1−0.2)/0.2=32 (32-BYTE INTERVAL IS OPENED)

F I G.  1 5

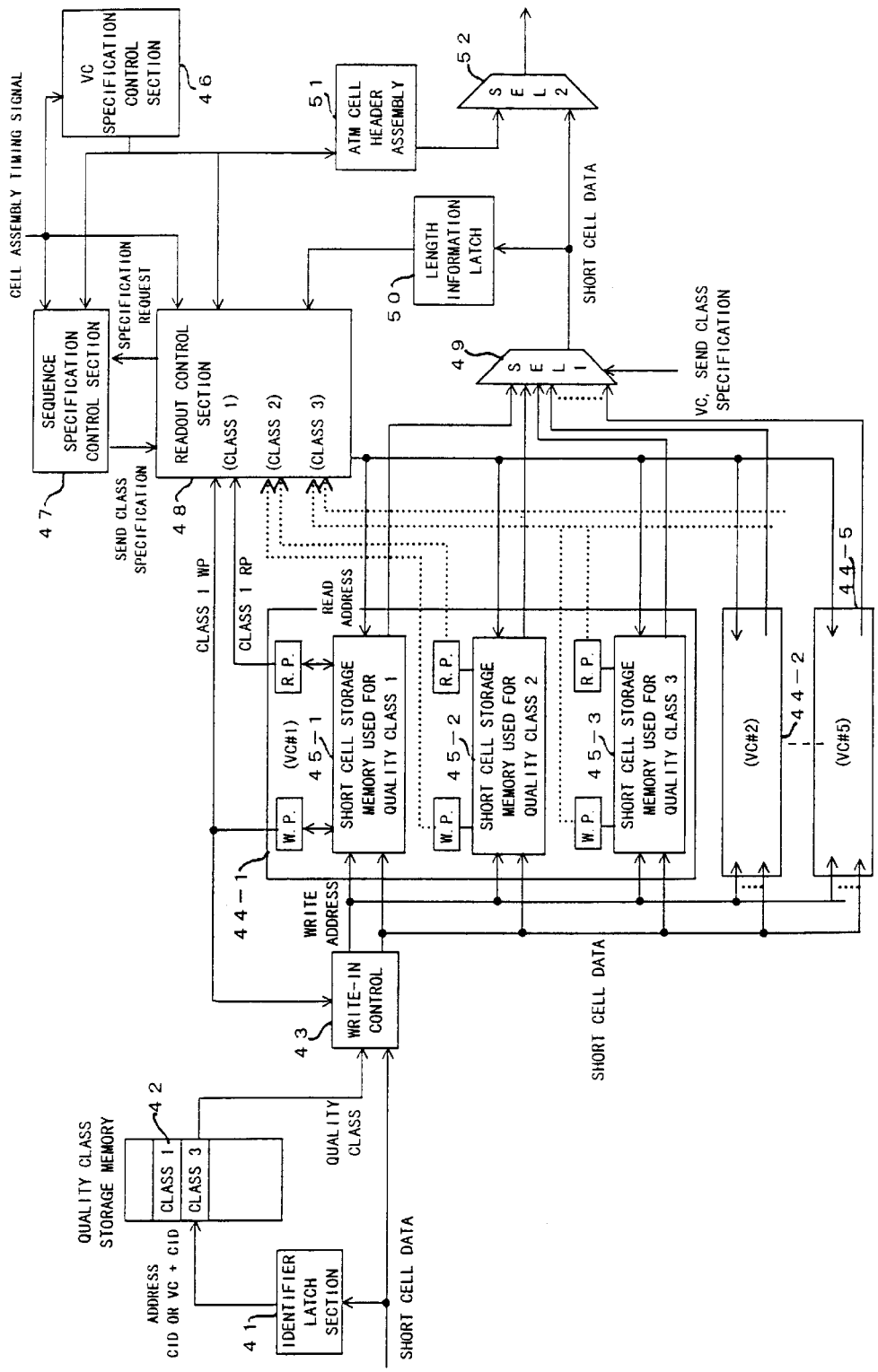
F I G. 16

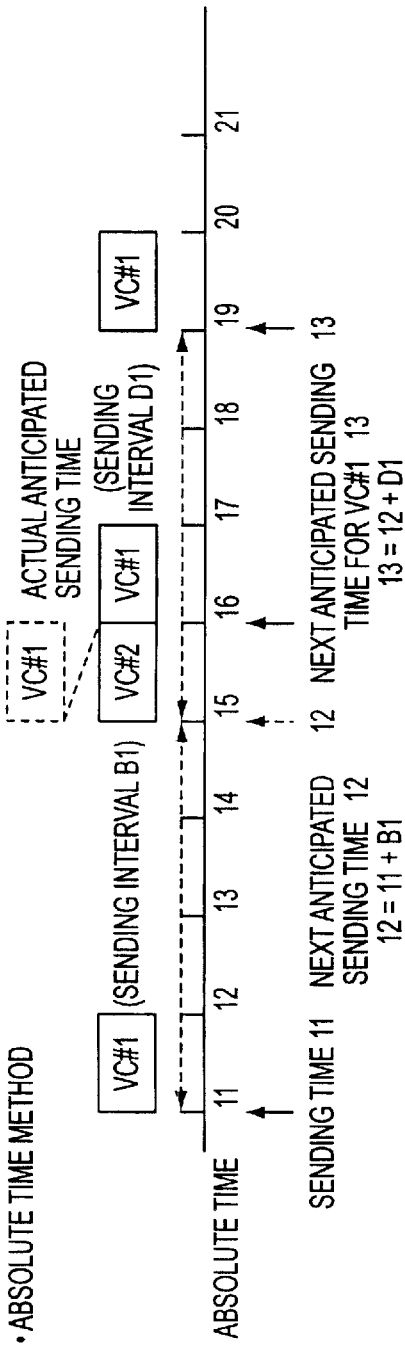

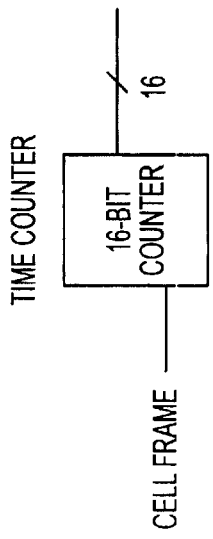
FIG. 28B
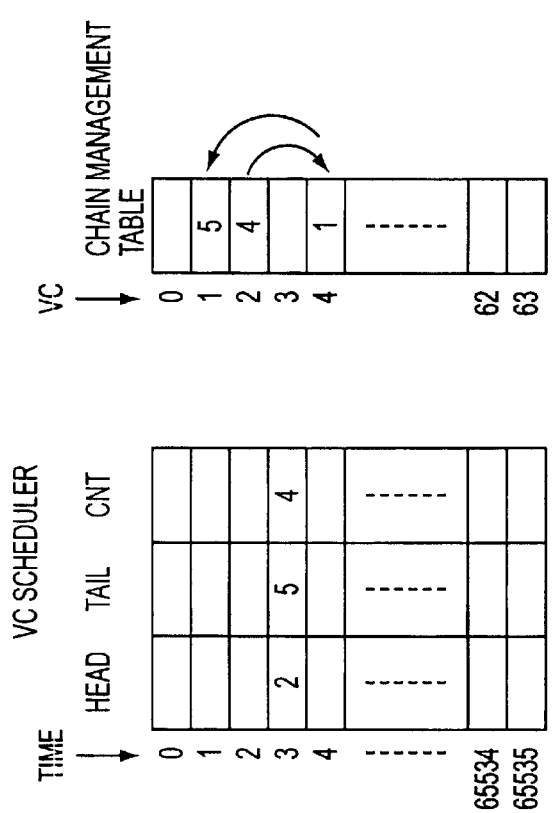
FIG. 28C
FIG. 28A

SHORT-CELL MULTIPLEXING DEVICE

BACKGROUND OF THE INVENTION

1. Field of the Invention

This invention relates to a device that stores variable length packets in fixed length packets. In particular, it relates to a device that multiplexes AAL Type 2 short cells on an ATM connection.

2. Description of the Related Art

In recent years, various types of information are being transferred via networks. However, the transmission rate and quality (delay time, error rate, etc.) required for each type of communication service are different. For example, when audio data are transferred, a slow transmission rate is sufficient, but it is necessary to keep the delay time as short as possible. When motion picture data are transferred, fast transmission rate and short delay time are required at the same time. Meanwhile, when E-mail and files are transferred, or when control signals are transferred, the requirement regarding delay time is not so strict. ATM has become a widespread technology for handling a unified communication service that provides various transmission rates and qualities as described above.

In ATM, information is transferred stored in fixed length ATM cells. An ATM cell consists of a 5-byte header and a 48-byte payload. Routing information, etc. is stored in the header, while the information to be transferred is stored in the payload.

FIG. 1 is a configuration diagram of a CLAD. A CLAD (CeL1 Assembly and Disassembly unit) has a function that stores information to be transferred in ATM cells and a function that extracts information stored in the ATM cells and reproduces the transferred information.

FIG. 1 shows the cell assembly section of a CLAD. This CLAD consists of a data storage buffer 501, a data amount monitoring section 502, a readout control section 503 and an ATM cell header assembly section 504. Input data are stored in the data storage buffer 501 in the order in which they arrive. The data amount monitoring section 502 monitors the amount of data stored in the data storage buffer 501; when enough data to make a cell (for example 48 bytes) have accumulated, that fact is posted to the readout control section 503. When the readout control section 503 receives this notice, it reads out enough data for 1 cell from the data storage buffer 501; then the ATM cell header assembly section 504 appends a header to the data that were read out to generate a cell and the cell is sent out.

In communication using ATM, normally the transferred information is stored in ATM cell payloads for the transfer. A connection that transfers ATM cells is identified by VPI/VCI. One ATM cell stores information that is transmitted via one connection.

However, in mobile communication using a wireless network, in order to use the communication band effectively the information to be transferred is compressed; for example, the information might be transferred at the low rate of several kb/s to several tens of kb/s. When information to be transferred at such a low rate is assembled into ATM cells, the cell assembly delay becomes large, which is undesirable from the point of view of quality. That is to say, in a general ATM, as explained above, the information to be transferred is assembled into an ATM cell only when a certain amount of information has accumulated, so if that information is transferred at a low rate, the interval between sending of ATM cells becomes long, which sometimes causes delay.

At present, in, for example, an ATM forum or ITU-T, in order to reduce delays such as described above work has been proceeding to make it possible to store variable length packets called short cells, containing only small amounts of information, in ATM cells.

FIG. 2 conceptually shows the processing in which short cells are stored in the payload of an ATM cell. A short cell consists of a short cell header and a short cell payload. A short cell header includes a CID (short cell Connection IDentifier) for the purpose of identifying the connection of that short cell, and an LI (Length Indicator) that indicates the payload length of that short cell.

The payload of each ATM cell is stored in one or more short cells. Each ATM cell can store short cells that have different CIDs from one another. Storing short cells that have mutually different CIDs in one ATM cell in this manner, that is to say, sending short cells having mutually different CIDs on one ATM connection, is called "short cell multiplexing". Depending on the length of a short cell and the location where that short cell is stored, it is also possible for one short cell to be split and stored in 2 ATM cells. This condition is called "overlap".

By multiplexing a plurality of short cells on one ATM connection in this manner, it is expected to become possible to transmit information at a low bit rate with small delay and to make efficient use of the ATM connection.

In order to construct a system that stores and transfers short cells in ATM cells, basically it is sufficient to install a CLAD shown in FIG. 1 in each Virtual Connection (VC) in the ATM network. For example, if this kind of system is used in a mobile communication network, in a base station (local area station) that sends and receives wireless signals between mobile terminals a CLAD is installed in each virtual connection that is established between that base station and the exchange station (ATM switch) that accommodates that base station. The base station generates short cells from the information received from the mobile terminal, then uses the CLAD to store that short cell in an ATM cell and sends that ATM cell to the exchange station via an ATM connection.

In general, in a system such as a mobile communication network, there are many base stations. Consequently, in order to hold the cost of the system down, the cost of each of the base stations must be reduced.

However, if a CLAD is installed in each ATM connection in each base station as described above, the hardware configuration will become large-scale, and it will become difficult to hold the cost down. In order to solve this problem, it is desirable to have a configuration in which short cells can be multiplexed on a plurality of ATM connections in one device.

In addition, each short cell is required to have different quality. Accordingly, the quality of the ATM connection that transmits an ATM cell that stores short cells should be controlled in a manner that is related to the quality of the short cells that are being transmitted. However, at present technology for multiplexing short cells on an ATM connection is still under development and has not yet been established. For this reason, technology for controlling the quality of an ATM connection considering the quality of each short cell also has not been established.

SUMMARY OF THE INVENTION

The purpose of this invention is to provide a device that efficiently multiplexes variable length packets (for example, AAL Type 2 short cells) on a virtual connection in a fixed length packet transfer network (for example, an ATM network).

The short cell multiplexing device of this invention accommodates a plurality of virtual connections established in a fixed length packet transmission network, and multiplexes the short cells in the plurality of virtual connections. The short cell multiplexing device includes the following units.

An Identifying unit identifies a virtual connection to which a received short cell is to be sent. A storing unit stores the received short cell based on the virtual connection identified by the identifying unit. A specifying unit specifies virtual connections in order from among the plurality of virtual connections in accordance with a predetermined algorithm. A reading unit reads a short cell out from the storing unit based on the virtual connection specified by the specifying unit. A sending unit stores the short cell read out by the reading unit in a fixed length packet, and then sends the fixed length packet in which the short cell is stored to the virtual connection specified by the specifying unit.

In the configuration described above, even if short cells have mutually different identifiers, if those short cells are sent to the same virtual connections on a fixed length packet transmission network, those short cells are all identified with that virtual connection, and are stored by the storing unit. Consequently, in this case, when that virtual connection is specified by the specifying unit, the short cells are read out from the storing unit under the same conditions as one another, and are multiplexed in the same virtual connection on the fixed length packet transmission network.

At this time, a specifying unit specifies one at a time in order from among the accommodated plurality of virtual connections in accordance with a predetermined algorithm, so by appropriately determining the algorithm, the efficiency, when the short cells are multiplexed on the plurality of virtual connections, is optimized.

Thus, a specifying unit which specifies virtual connections in a short cell multiplexing device that accommodates a plurality of virtual connections has been established, so it is possible to perform multiplexing processing with respect to a plurality of virtual connections. In addition, if shared memory technology is applied in the storing unit that stores the short cells, it is sufficient to set up one memory for all of the virtual connections which this short cell multiplexing device stores, so the amount of hardware is reduced.

BRIEF DESCRIPTION OF THE DRAWINGS

FIG. 10 is a diagram explaining the concept of the method of specifying ATM virtual connections based on cell interval specification method #1;

FIG. 15 is a diagram explaining the concept of the method of specifying a quality class based on the byte interval method;

FIG. 16 is a detailed configuration diagram of the short cell multiplexing device of this embodiment;

FIG. 25A is a conceptual diagram of the method of determining the anticipated time of sending ATM cells using absolute time;

FIG. 25B is a conceptual diagram of the method of determining the anticipated time of sending ATM cells using relative time;

FIGS. 28A and 28C are logical configuration diagrams of the memory area used to control the VC specification;

FIG. 28B is a configuration diagram of the time counter;

DESCRIPTION OF THE PREFERRED EMBODIMENT

This invention can be widely applied to systems in which variable length packets are stored in fixed length packets and those fixed length packets are transferred via a network intended for use with fixed length packets; but in this embodiment, we explain fixed length packets as ATM cells and variable length packets as AAL Type 2 short cells.

Figure 3:
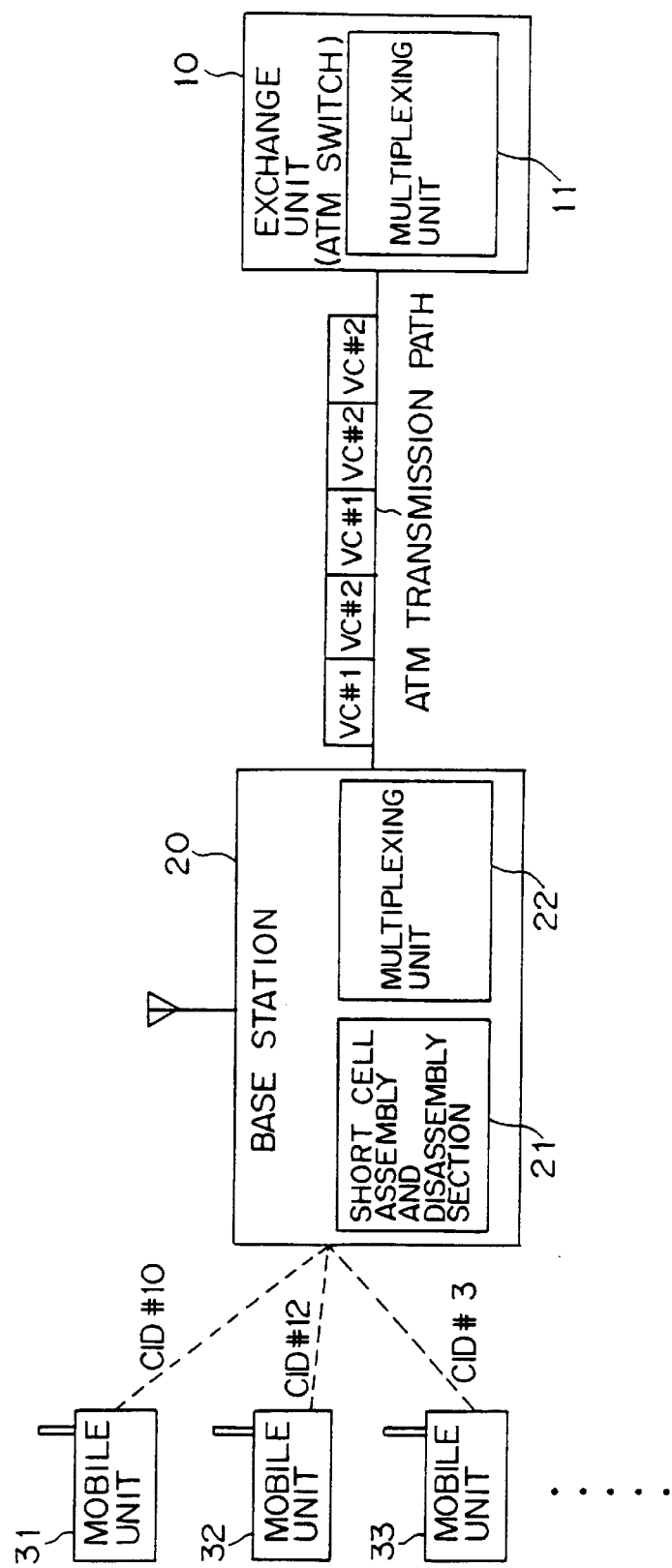
FIG. 3 is a configuration diagram of the system of one embodiment in which the short cell multiplexing device of this invention is applied.

FIG. 3 is a configuration diagram of the system of one embodiment in which the short cell multiplexing device of this invention is applied. Here, we explain a mobile communication system as the embodiment. When compression processing is performed on audio data in the mobile communication system, the transmission rate is only on the order of several kbps, but on the other hand the requirements with regard to delay are severe. Data transfer using short cells is suitable for services that want to keep the delay to a minimum even though the rate is slow.

In FIG. 3, the exchange unit (ATM switch) 10 exchanges ATM cells based on the routing information (VPI/VCI) stored in the headers of those ATM cells. The exchange unit 10 accommodates a plurality of base stations.

The base station 20 accommodates a plurality of mobile units by sending wireless signals to, and receiving wireless signals from, them. The base station 20 has the short cell assembly and disassembly unit 21 and the multiplexing unit 22. The short cell assembly and disassembly unit 21 creates short cells from data sent from the mobile units. The multiplexing unit 22 stores the short cells created by the short cell assembly and disassembly unit 21 in ATM cells, and sends the ATM cells to the exchange unit 10. The base station 20 has functions that extract the short cells from the ATM cells received from the exchange unit 10, then extract the information to be sent to mobile units from those short cells and send it to the corresponding mobile units.

Each of the connections between the base station 20 the mobile units is identified by a short cell Connection IDentifier (CID). In the example shown in FIG. 3, the connections between the base station 20 and each of the mobile units 31 to 33 are identified by CID#10, CID#12 and CID#3, respectively. These short cell connection identifiers are assigned uniquely by the base station when the connections are established.

When the short cell assembly and disassembly unit 21 creates short cells from the data sent from the mobile units, short cell connection identifiers are appended to those short cells. When the multiplexing unit 22 receives those short cells, it detects the VPI/VCIs corresponding to the short cell connection identifiers of those short cells. The correspondence relationships between the VPI/VCIs and those short cell connection identifiers are, for example, determined at the time a call is established and registered in a table, which is not shown, in the multiplexing unit 22. Here, each of the virtual connections identified by a VPI/VCI can be made to correspond to one or more short cell connection identifiers. That is to say, a plurality of types of short cells can be multiplexed in each ATM virtual connection. For example, the short cell identified by "CID#10" and the short cell identified by "CID#12" can be multiplexed on the ATM virtual connection VC#1.

Figure 4C:
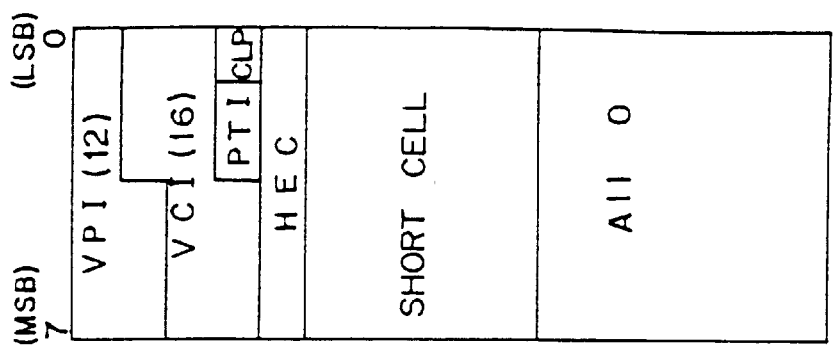
FIGS. 4B and 4C are diagrams showing the AAL-CU cell format.
Figure 4B:
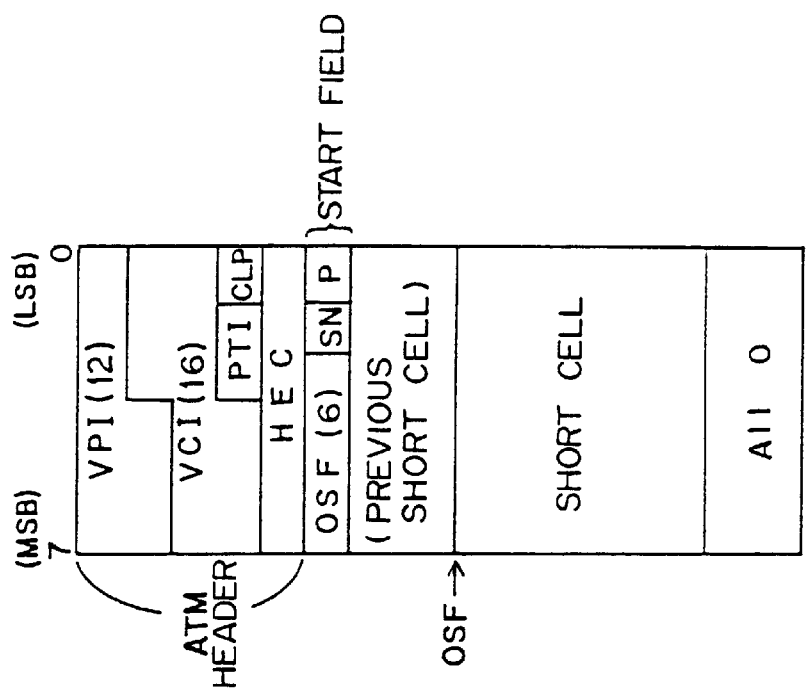
Figure 4A:
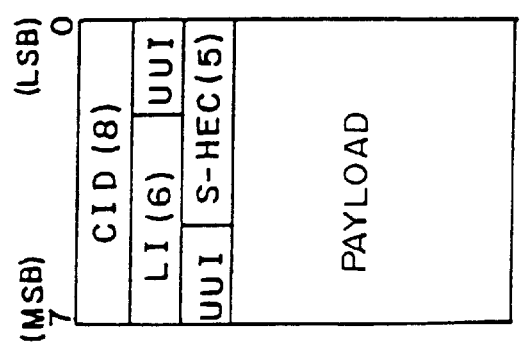
FIG. 4A is a diagram showing one example of a short cell format.

FIG. 4A is a diagram that shows the short cell format. "CID" is a short cell connection identifier. Each short cell is identified by this CID. "LI" is information that indicates the short cell payload length; It takes values from 0 to 44. LI=0 indicates that the short cell payload consists of one byte. "UUI" is a user identifier; 5 bits are assigned to it. "S-HEC" is short cell header error control; the polynomial that it generates is $x^5+x^2+1$. The payload is the area in which the information to be transferred is stored.

FIG. 4B shows the format of an ATM cell (the cell AAL-CU) in which short cells are stored. The ATM header consists of a VPI (Virtual Path Identifier), VCI (Virtual Channel Identifier), PTI (Payload Type Identifier), CLP (Cell Loss Priority) and HEC (Header Error Control). The start field is set in the 1st byte of the payload. The start field consists of an OffSet Field (OSF) that indicates the start position of the area in which the short cell is stored, a Sequence Number (SN) and Parity (P). Values from 0 to 47 can be set as the offset field. OSF=0 indicates that short cells are stored from immediately after the start field; OSF=47 indicates that there is no end of a short cell within that particular ATM cell. The sequence number is modulo 2; it is set to "0" or "1" in accordance with the order in which ATM cells are sent. Parity is odd parity for the 7 bits consisting of the OSF and SN.

Figure 1:
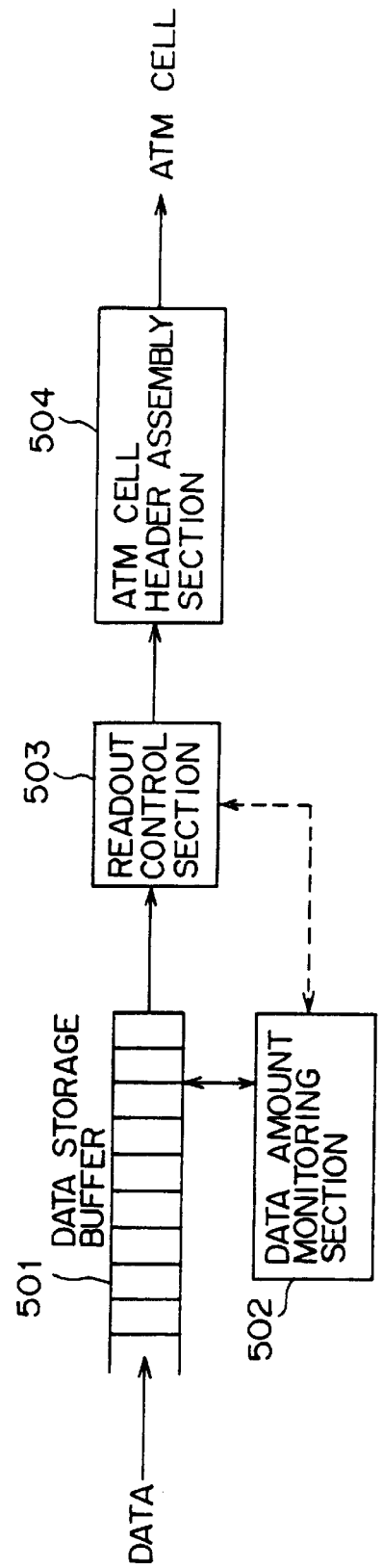
FIG. 1 is a configuration diagram of a CLAD.
Figure 2:
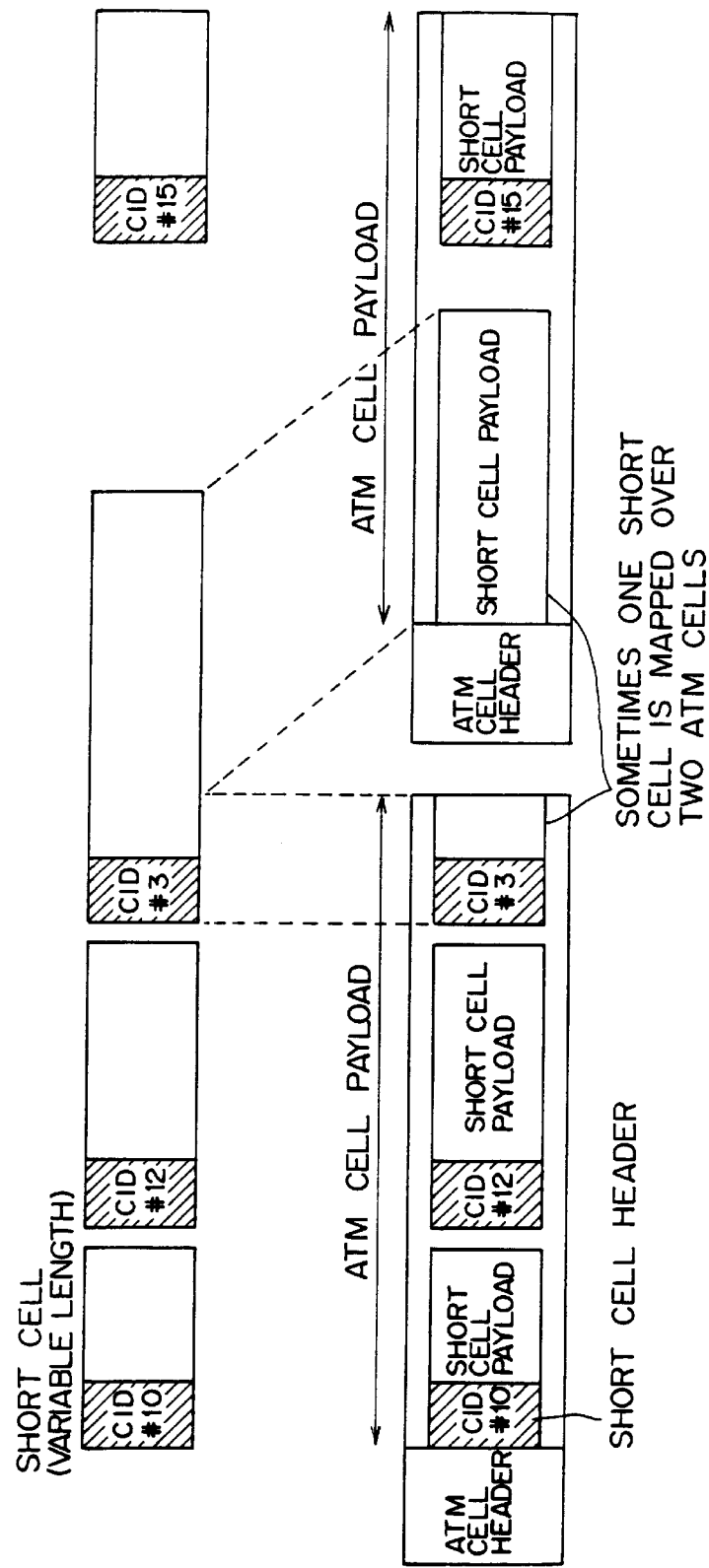
FIG. 2 is a diagram conceptually showing the processing in which short cells are stored in an ATM cell payload.

The short cells shown in FIG. 4A are stored in the 2nd and subsequent bytes of the ATM cell payload. Here, a short cell is a variable length packet. Consequently, when a short cell is stored in an ATM cell, it is possible, as shown in FIG. 2, that it will be split into 2 or more parts each of which is stored in a different ATM cell. In FIG. 4B, part of one short cell and all of another short cell are stored in an ATM cell payload. In this case, the information that indicates the start position of the 2nd short cell is the OSF. "0" is written into all spaces in which ATM payload data are not stored. If a plurality of short cells are stored in one ATM cell, the short cell connection identifiers of that plurality of short cells can be either the same as or different from one another.

The ATM cell shown in FIG. 4B has, for example, the configuration shown in FIG. 3, when ATM cells are sent and received between a base station 20 and an exchange unit 10. Meanwhile, inside the exchange unit 10, ATM cells that store short cells have, for example, the data structure shown in FIG. 4C. That is to say, inside the exchange unit 10, one short cell is stored inside one ATM cell; there is no start field. When the exchange unit 10 sends the short cell stored in the ATM cell shown in FIG. 4C to the base station 20, first the short cell is extracted from that ATM cell; then that short cell is stored in the ATM cell shown in FIG. 4B and output onto the ATM transmission path. This processing is executed by the multiplexing unit 11.

Figure 5:
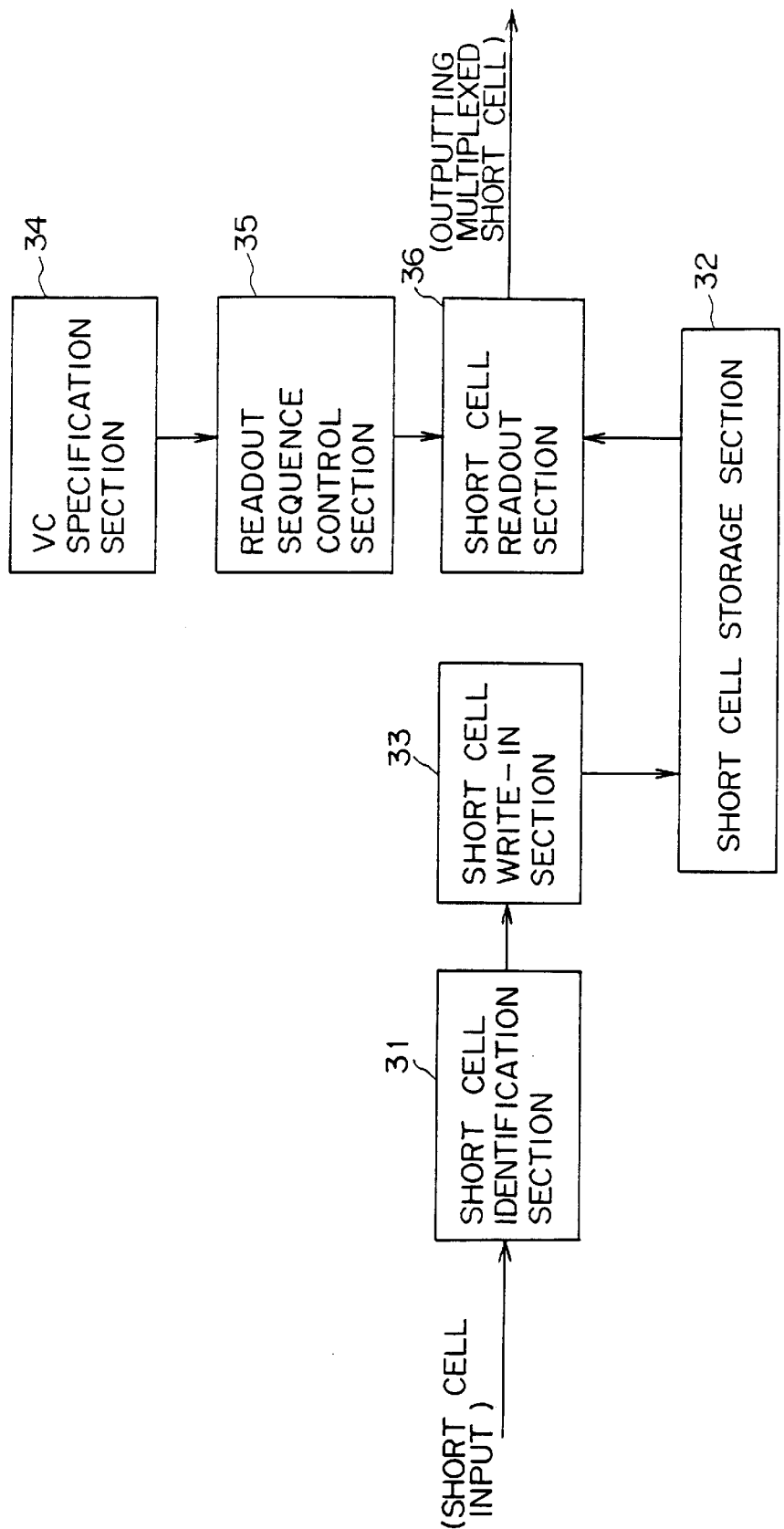
FIG. 5 is a block diagram of the short cell multiplexing device of this embodiment.

FIG. 5 is a block diagram of the short cell multiplexing device of this embodiment. This device corresponds to the multiplexing unit 11 or 22 in FIG. 3.

The short cell identifier section 31 recognizes information that identifies the quality class of a short cell that arrives and the ATM virtual connection on which that short cell is transmitted based on the short cell connection identifier (referred to below as the CID) of that short cell. The information that identifies an ATM virtual connection is actually a VPI/VCI or a VCI, but below it will be called the VC number. The VC number identifies the plurality of ATM virtual connections that this short cell multiplexing device accommodates. The correspondence relationship between the CID and the quality class, and the correspondence relationship between the CID and the VC number, are, for example, determined by negotiation between the terminal device and the network at the time the call is set up; and are registered inside this short cell multiplexing device. The multiplexing unit 11 that is installed inside the exchange unit 10 creates the ATM cell shown in FIG. 4B from the ATM cell shown in FIG. 4C, so the correspondence relationship between the CID and the VC number is recognized at the time the ATM cell shown in FIG. 4C is received. Consequently, the multiplexing unit 11 recognizes the quality of that short cell from the combination of the CID and the VC number. In addition, if the CID of a received short cell is not registered, the short cell identification section 31 discards that short cell.

The short cell storage section 32 is, for example, a semiconductor memory; it temporarily stores short cells that arrive in accordance with instructions from the short cell write-in section 33. The short cell write-in section 33 writes each short cell that arrives into the short cell storage section 32 based on the VC number and the quality class of that short cell.

The VC specification section 34 determines the ATM virtual channel to which ATM cells should be sent in accordance with a predetermined processing sequence, and outputs a VC number that identifies that ATM virtual channel. The readout order control section 35 determines the quality class of short cells that should be read out of the short cell storage section 32 in accordance with a predetermined processing sequence. The short cell readout section 36 reads one short cell at a time out of the short cell storage section 32 in accordance with instructions from the VC specification section 34 and the readout order control section 35, and outputs the short cells. The short cells read out from the short cell storage section 32 are stored in the ATM cell payload and then an ATM header is appended in that ATM payload to create an ATM cell. Then this ATM cell is sent to the ATM virtual connection specified by the VC specification section 34.

Figure 6:
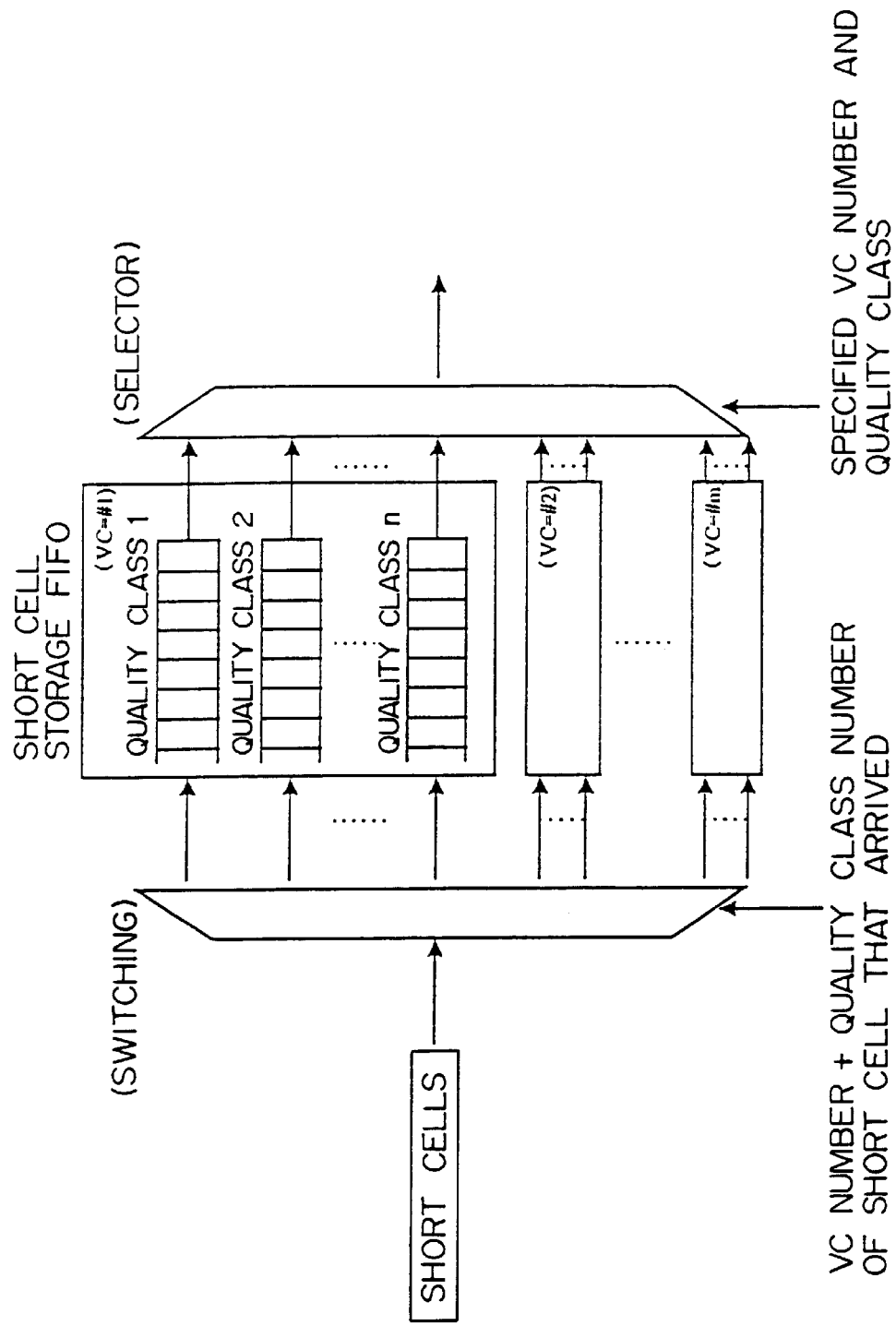
FIG. 6 is a configuration diagram of the short cell storage section.

FIG. 6 is a configuration diagram of the short cell storage section. The short cell storage section 32 has a buffer area for each ATM virtual connection (that is to say, each VC number). In addition, the buffer area of each ATM virtual connection has a buffer for each quality control class. These buffers are, respectively, FIFO memories. The buffer for each ATM virtual connection and for each quality class is a logically partitioned memory area; for example, this area could exist within one semiconductor memory element.

When a short cell arrives at a short cell multiplexing device, its VC number and quality class are recognized based on the CID stored in the short cell header, and that short cell is written into the specified area inside the short cell storage section 32 corresponding to its VC number and quality class. Meanwhile, when a short cell is read out from the short cell storage section 32, the short cell is read out from the area corresponding to the VC number specified by the VC specification section 34 and the quality class specified by the readout sequence control section 35.

Next, let us explain the basic action of the VC specification section 34. The VC specification section 34, as explained above, determines the ATM virtual channel to which ATM cells should be sent in accordance with a predetermined sequence, and outputs a VC number that identifies that determined ATM virtual channel. Consequently, here we explain the outline of the method of specifying the ATM virtual connection. In this embodiment, the following 5 methods of specifying an ATM virtual connection are specified.

Method A: Counting of Cell Sending Intervals for Each ATM Virtual Connection (Cell Sending Interval Counting Method)

Figure 7:
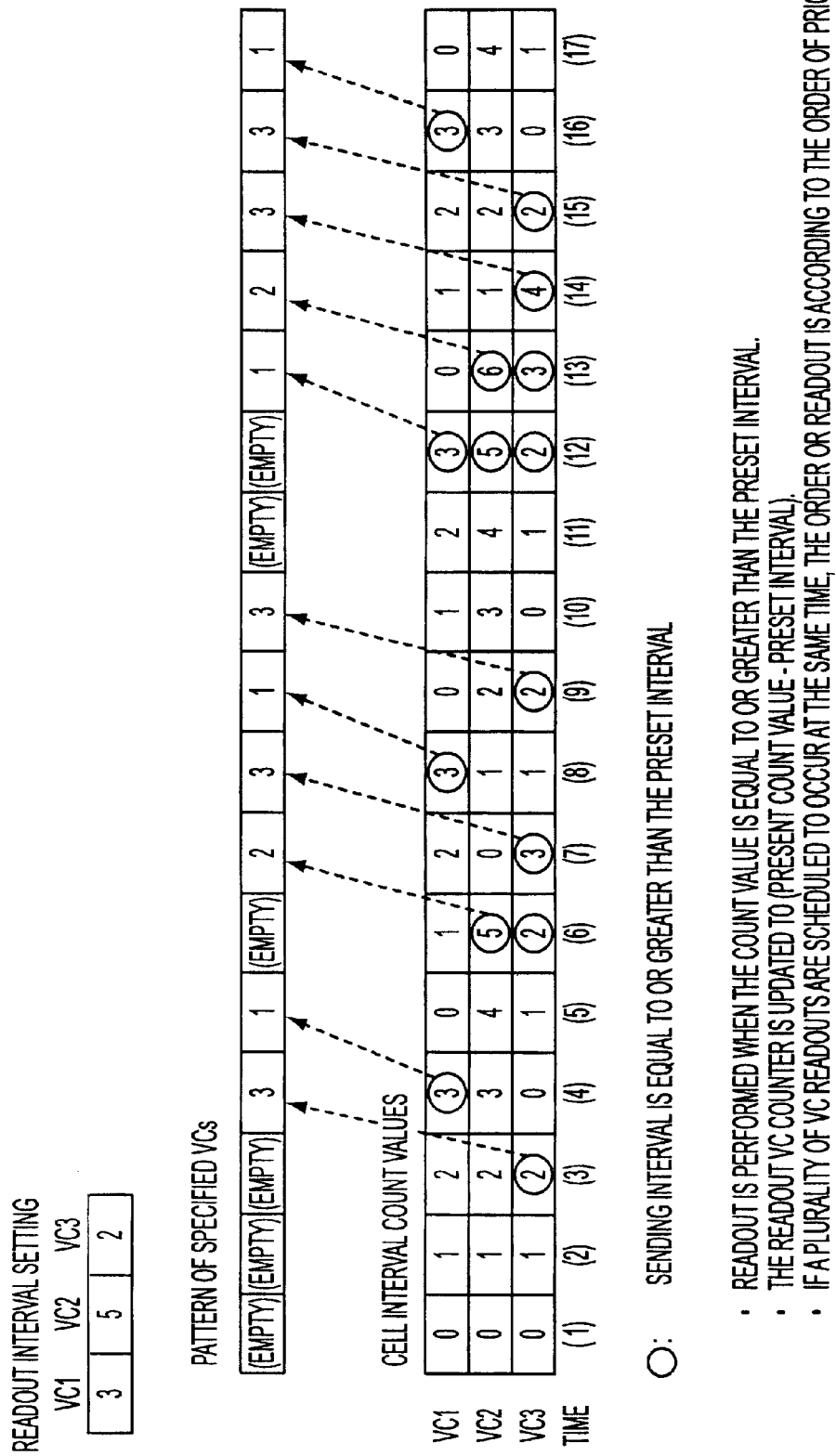
FIG. 7 is a diagram explaining the concept of the method of specifying VCs based on the cell sending interval counting method.

FIG. 7 explains the concept of the method of specifying an ATM virtual connection based on the cell sending interval counting method. In this method, the time interval at which ATM cells should be sent is prespecified for each ATM virtual connection. This time interval is related to the transmission rate of the ATM transmission path, the unit of time is the time that corresponds to one time slot assigned to each ATM cell when an ATM cell is sent. Below, this unit time will be called the "1 cell time". Further, a cell interval counter is installed for the purpose of counting the time elapsed after each time an ATM cell is sent to each ATM virtual connection. The count value of each cell interval counter is read after each specified time (each time the "1 cell time" elapses), and those count values are compared with the sending interval preset for each respective ATM virtual connection. At this time, if there is a cell interval counter for which the count value that is read is equal to or greater than the preset sending interval, a VC number that identifies the ATM virtual connection corresponding to that cell interval counter is output. This VC number is information for the purpose of specifying one from among the plurality of buffers (see FIG. 6) that are set up for each ATM virtual connection.

When the VC specification section 34 thus specifies a VC number, 1 or more short cells are read out from the buffer corresponding to that specified VC number in the short cell storage section 32. This short cell that has been read out is stored in an ATM cell and sent to the ATM virtual connection that corresponds to that specified VC number.

Each cell counter is incremented by 1 each time the 1 cell time elapses. In addition, the count value of the cell interval counter corresponding to the specified VC number is updated to "the present count value—the cell sending interval preset for that ATM virtual connection". Further, if the state in which a short cell should be read out has been reached in a plurality of ATM virtual connections, one of the ATM virtual connections is selected in accordance with a predetermined order of priority, and the VC number that corresponds to that ATM virtual connection is specified.

Now let us explain the embodiment shown in FIG. 7. Here, there are 3 ATM virtual connections (VC#1, VC#2 and VC#3), and the respective ATM cell sending times for the ATM virtual channels are preset to "3", "5" and "2". In addition, the count values of the cell interval counters set up for each ATM virtual connection are all reset to the time 1.

The count value of each cell interval counter is incremented with time, so that the values are "2" at time 3. At this time, the count value of the cell interval counter corresponding to VC#3 becomes equal to the cell sending interval preset for VC#3. When this fact is detected, the VC specification section 34 outputs "#3" as the VC number.

Next, at time 4, the count values of the cell interval counters corresponding to VC#1 and VC#2 both become "3". Meanwhile, the count value of the cell interval counter corresponding to VC#3 is decremented by "2", which is the set value of the sending interval, and becomes "0". At this time, the count value of the cell interval counter corresponding to VC#1 becomes equal to the cell sending interval preset for VC#1. When this fact is detected, the VC specification section 34 outputs "#1" as the VC number.

At time 5, the count values of each cell interval counter become smaller than the respective sending intervals set for each ATM virtual connection. Consequently, at time 5 the VC specification section 34 does not specify anything.

Next, at time 6, the count values of the cell interval counters VC#2 and VC#3 become equal to or greater than the respective sending intervals that are set. Thus, if the count values of the cell interval counters corresponding to a plurality of ATM virtual connections respectively become equal to or greater than the corresponding sending interval settings, the VC number is specified in accordance with a predetermined order of priority among ATM virtual connections. In FIG. 7, the highest priority is given to VC#1; the case in which VC#3 is set to the lowest priority is shown.

The short cell readout section 36 reads short cells out from the short cell storage section 32 in accordance with the VC numbers specified in sequence by the VC specification section 34. That is to say, when "#3" is specified as the VC number, the short cell readout section 36 reads 1 or more short cells out from the buffer corresponding to VC#3 in the short cell storage section 32; when "#1" is specified, 1 or more short cells are read out from the buffer corresponding to VC#1. Then the short cells read out from the buffer corresponding to VC#3 are stored in an ATM cell and sent to the ATM virtual connection VC#3; the short cells read out from the buffer corresponding to VC#1 are stored in an ATM cell and sent to the ATM virtual connection VC#1.

Here, each short cell is stored in the corresponding buffer in accordance with the ATM virtual connection to which it is to be sent. That is to say, even in the case of short cells that have mutually different CIDs, they can be stored inside the same buffer in the short cell storage section 32. Consequently, short cells that have mutually different CID are multiplexed on the same ATM virtual connection.

With timing for which the VC specification section 34 does not specify anything, as at time 5 in the example in FIG. 7, the short cell readout section 36 does not read short cells out from the short cell storage section 32. In this case, the short cell multiplexing device sends idle cells onto the ATM transmission path.

Thus, in the cell sending interval counting method, there is no need to preset a readout sequence pattern, and it is sufficient to specify the interval at which ATM cells are read out to each ATM virtual connection; the operations that need to be performed for initial setting and for addition or deletion of an ATM virtual connections are simple. However, it is necessary to have a counter that counts the cell intervals for each ATM virtual connection, so when there are many ATM virtual connections on an ATM transmission path, the scale of the hardware becomes large.

Method B: Credit Method #1

Figure 8:
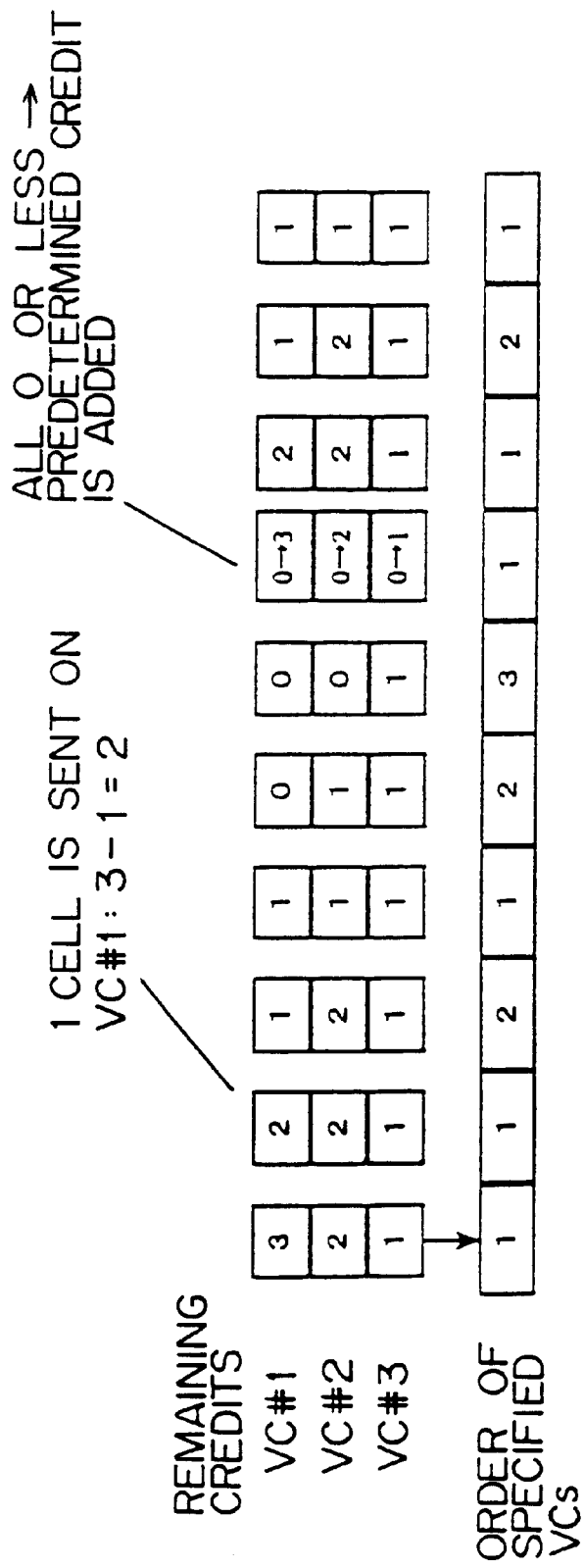
FIG. 8 is a diagram explaining the concept of the method of specifying VCs based credit method #1.

FIG. 8 explains the concept of a method of specifying ATM virtual connections based on Credit Method #1. In this method, "credit" is preset for each ATM virtual connection. Credit is a value that specifies the number of ATM cells that should be sent within a certain period of time. Consequently, by specifying the credit for each ATM virtual connection, the ratio of the number of ATM cells that are sent to the number of ATM virtual connections is determined. In Credit Method #1, this short cell multiplexing unit compares the credit of each ATM virtual connection for each ATM cell sending timing; the VC numbers corresponding to the ATM virtual connections that have the largest values (the most credit) are specified in sequence.

Let us explain the embodiment shown in FIG. 8. In the Credit Method, predetermined values are set as credit for each of the ATM virtual connections. Here, "3", "2" and "1" are set as the credits for VC#1 to VC#3, respectively. The credit for each ATM virtual connection is compared at each ATM cell sending timing, and the VC number corresponding to the ATM virtual connection for which this value is largest is specified. At this time, the credit corresponding to that specified VC number is decremented by 1.

For example, when the credits for VC#1 to VC#3 are "3", "2" and "1", respectively, "#1" is specified as the VC number. As a result, the credits for VC#1 to VC#3 become "2", "2" and "1", respectively. Next, similarly, the ATM virtual connection for which this value is largest among these 3 credits is selected. However, at this time the credit for VC#1 is the same as the credit for VC#2. In a case such as this, a predetermined order of priority among the ATM virtual connections is followed. Here, a high priority is assigned to VC#1, and "#1" is specified as the VC number. As a result, the credits for VC#1 to VC#3 become "1", "2" and "1", respectively. Again, similarly, among these 3 cred- its the ATM virtual connection for which that value is largest is selected. In this case, "#2" is specified as the VC number. Subsequently, in a similar manner VC numbers are specified one at a time until the credits for the ATM connections are all 0. Then, when all of the credits become 0 or less, the initial setting value is added to the present value of the credit for each ATM virtual connection. As a result, the credits of VC#1 to VC#3 return to "3", "2" and "1", respectively.

Similarly to the case of the Cell Sending Interval Count Method, the short cell readout section 36 reads short cells out from the short cell storage section 32 in accordance with the VC numbers specified in sequence by the VC specification section 34.

In the Credit Method described above, VC specification control is performed merely by setting the credit values for each ATM virtual connection, so even if an ATM virtual connection is added or deleted the system can be easily reconstructed. However, in a case in which the credit of one given ATM virtual connection is much larger than the credits of the other ATM virtual connections, there is a danger that ATM cells will then be sent only to that ATM virtual connection and not to other ATM virtual connections for a certain period of time, leading to an imbalance among ATM virtual connections.

Method C: Credit Method #2

Figure 9:
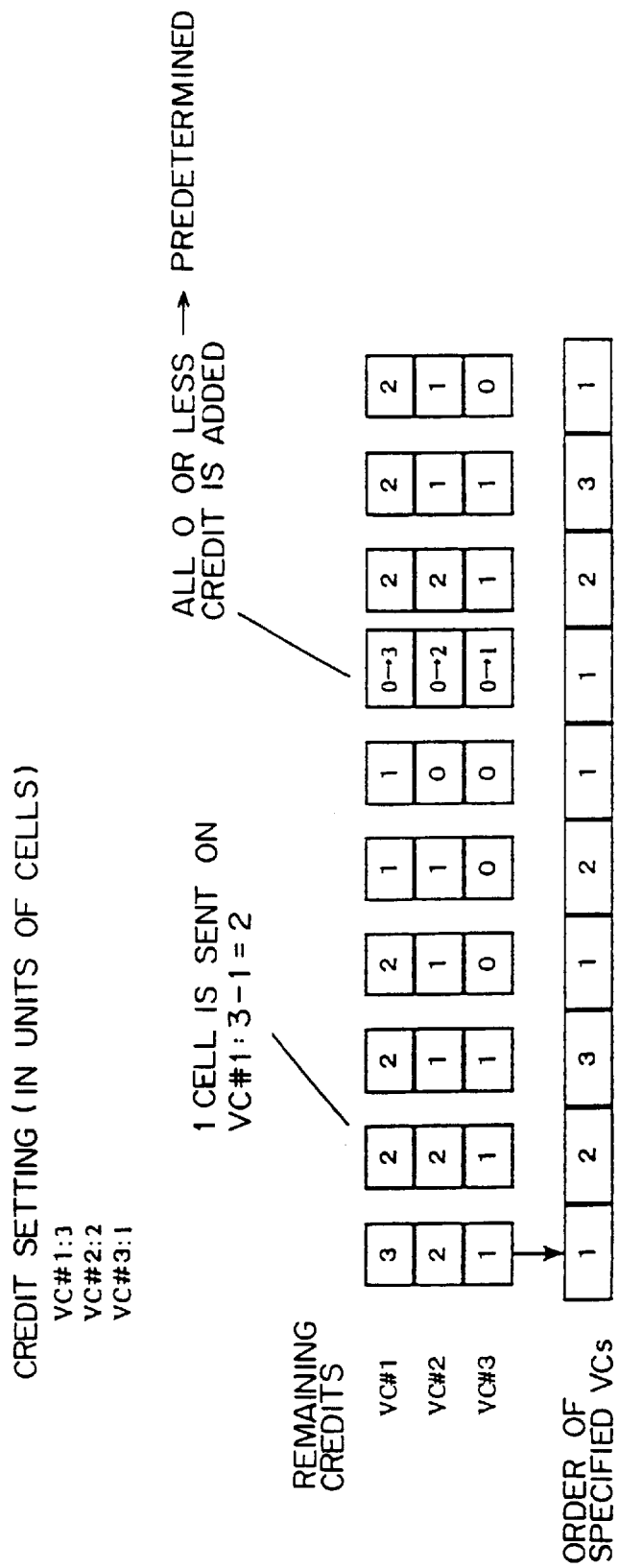
FIG. 9 is a diagram explaining the concept of the method of specifying VCs based credit method #2.

FIG. 9 explains a variation of Method B shown in FIG. 8. In the method shown in FIG. 9, the ATM virtual connections that have credit values larger than a certain threshold (0 in FIG. 9) are extracted, and then ATM virtual connections are specified one at a time in sequence from among those ATM virtual connections that were extracted. For example, if the credit values of VC#1 to VC#3 are "3", "2" and "1", respectively, the credit values corresponding to all 3 of those ATM virtual connections are larger than the threshold, so the VC specification section 34 specifies the VC numbers in the order "#1#, "#2", "#3". When the VC numbers are thus specified, the credits of VC#1 to VC#3 are decremented by 1 each to become "2", "1" and "0", respectively. In this situation, only the credits of VC#1 and VC#2 are larger than the threshold, so in this case the VC specification section 34 specifies "#1" and "#2", in that order, as the VC numbers. After that, when "#1" is specified as the VC number in the next step and all of the credits become 0, the setting values are added to the credits corresponding to all of the ATM virtual connections, as in the method shown in FIG. 8.

Compared to Method B shown in FIG. 8, this method suppresses the tendency for ATM cells to be sent in bursts.

Method D: Inter-Cell Interval Specification Method #1

FIG. 10 explains the concept of a method of specifying ATM virtual connections based on Inter-Cell Interval Specification Method #1. In this method, an area of memory is set aside to store the expected times at which the next ATM cell will be sent on each ATM virtual connection. In addition, the band ratio at the time that output line bands are assigned to each ATM virtual connection that is established on that output line is preset. Further, the time intervals from the time when each ATM cell is sent at a certain timing on each ATM virtual connection until sending of the next ATM cell starts are calculated in advance, in units of the 1 cell time, based on the band ratio. Then, when an ATM cell is sent in a certain ATM virtual connection, the expected time at which the next ATM cell should be sent is computed based on the computed interval for that ATM virtual connection.

The VC specification section 34 compares the present time to the expected sending time for each ATM virtual connection, every time 1 cell time elapses. If there is an ATM virtual connection for which the present time has reached the expected sending time, that ATM virtual connection is specified by sending the VC number of that ATM virtual connection.

The cell intervals for each of the ATM virtual connections are computed as follows.

cell interval=(1−band ratio)/band ratio

For example, in the 150 M transmission path, if 75 M is allocated to a certain ATM virtual connection, the VC band ratio becomes 0.5. In this case, the cell interval for this ATM virtual connection becomes "1".

In FIG. 10, "0.5" and "0.2" are allocated to the ATM virtual connections VC#1 and VC#2 as the respective band ratios. In this case, the cell intervals for VC#1 and VC#2 are "1" and "4", respectively. In this case, basically in VC#1 the present time exceeds the anticipated sending time in each 2-cell slot while in VC#2 the present time exceeds the anticipated sending time in each 5-cell slot, so the VC specification section 34 specifies VC#1 for each 2-cell slot and specifies VC#2 for each 5-cell slot. If, at a certain timing, the present time exceeds the anticipated sending time in a plurality of ATM virtual connections, one ATM virtual connection is specified in accordance with a predetermined order of priority, and the other ATM virtual connections are specified at the next and subsequent timings.

It is also possible to have a method in which the band ratio is not specified, but the cell sending interval is specified directly. In this case, it is not necessary to perform the calculation described above, so that processing time can be shortened.

Method E: Cell Interval Specification Method #2

In method D described above, anticipated cell sending times are stored for each ATM virtual connection. On the other hand, in method E, described below, a VC scheduler is set up for each ATM cell sending timing; when an ATM cell is sent in a certain ATM virtual connection, at the time when that ATM cell is sent the expected sending time of the next ATM cell in that same ATM virtual connection is calculated, and the VC number corresponding to that ATM virtual connection is stored in the VC scheduler corresponding to that expected time. This VC scheduler has basically the same action as an FIFO or a queue.

At every ATM cell sending time, the first VC number stored in the VC scheduler corresponding to that time is read out. This VC number is the output of the VC specification section 34. If one VC number is read out at a certain time and, at that same time, another VC number remains in the VC scheduler corresponding to that time, that VC number is shifted to the scheduler corresponding to the next time.

Figures 11A, 11B:
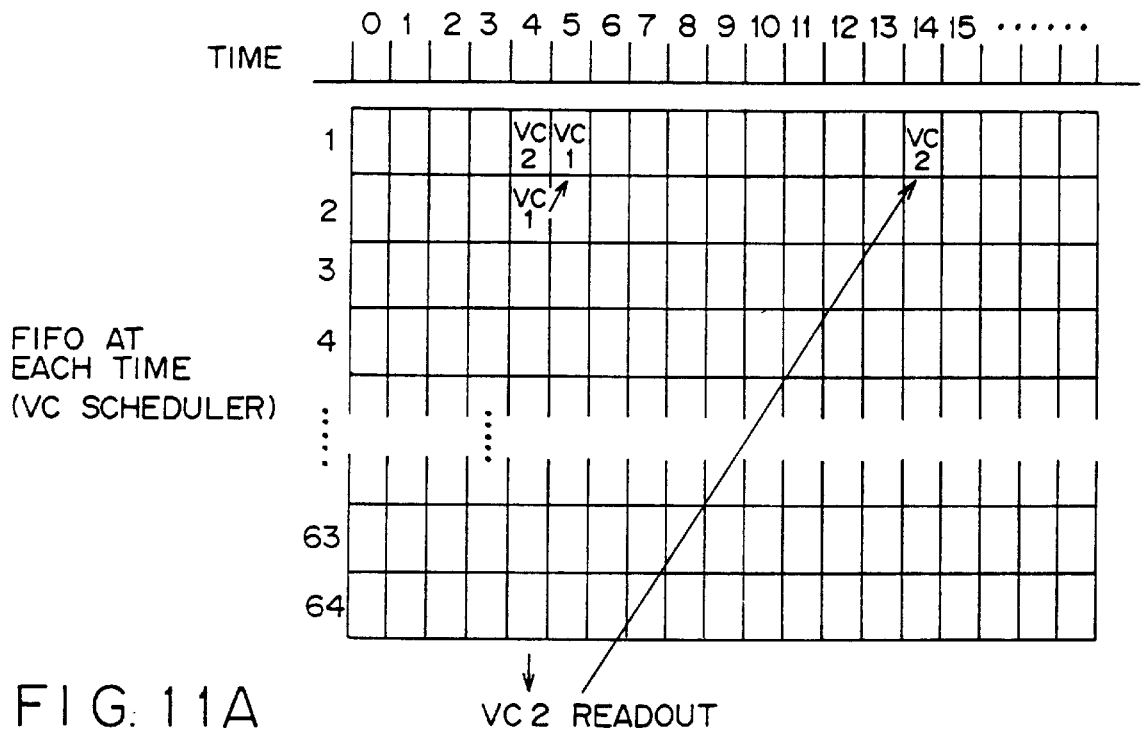
FIGS. 11A and 11B are diagrams explaining the concept of the method of specifying ATM virtual connections based on cell interval specification method #2.

FIG. 11A explains the concept of the method of specifying the ATM virtual connection based on Cell Interval Specification Method #2. Here, the case in which the multiplex number of the ATM virtual connection is 64 is shown. In this method, the VC specification section 34 has, as shown in FIG. 11B, a time management table in which the next anticipated ATM cell sending time for each ATM virtual connection is stored, and a cell interval management table in which the cell sending interval for each ATM virtual connection is set. The cell interval management table is preset. Every time one VC number is read out, the value (the anticipated sending time) corresponding to that VC number that was read out is updated in the time management table.

The processing procedure in this method will now be explained with reference to FIGS. 11A and 11B.

1. One VC number, corresponding to the specified time, is read out from the scheduler. For example, at time 4 "VC#2" is read out. This VC number that is read out becomes the VC number that is specified by the VC specification section 34. After "VC#2" is read out, "VC#1" remains in the scheduler corresponding to time 4; this remaining VC number is shifted to the scheduler for time 5.
2. With the VC number that was read out in step 1 above as a key, the time management table and the cell interval management table are accessed.
3. "Anticipated sending time+cell sending interval" is calculated in accordance with the data read out in step 2, and the result is taken to be the "next anticipated sending time". In the example shown in FIG. 11B, the sending interval for VC#2 is "10", so 4.7+10=14.7 is computed.
4. The next anticipated sending time computed in step 3 above is stored in the time management table.
5. That VC number is stored in the scheduler corresponding to the value of the integer part of the next anticipated sending time computed in step 3 above. In the example shown in FIG. 11A, "VC#2" is stored in the scheduler corresponding to time 14.

In the VC number read-out processing described above, when the next anticipated sending time is computed for a certain ATM virtual connection, if the present time already exceeds that anticipated time, the earliest possible time after the present time is set as the next anticipated time.

Thus, the VC specification section 34 specifies one VC number each for each ATM cell sending timing by one of the methods A to E described above. However, if an ATM virtual connection is not available to send an ATM cell at a certain timing, then the VC specification section 34 does not specify anything at that time.

Next, let us explain the basic action of the read-out sequence control section 35. The read-out sequence control section 35 specifies the quality class of the short cells to be multiplexed on the ATM virtual connection specified by the VC specification section 34. That is to say, the multiplexing device of this embodiment is of such configuration that, when a certain ATM virtual connection is specified by the VC specification section 34, one ATM cell is sent to that virtual connection; but the read-out sequence control section 35 specifies a quality class for the purpose of determining the short cells that should be stored in this ATM cell. When a quality class is specified, the short cell read-out section 36 reads short cells out from the buffer corresponding to that specified quality class from among the buffers corresponding to the previously specified VC number. In this embodiment, the following 4 methods of specifying the quality class are provided.

Method a: Read-Out Interval Control Method

Figure 12:
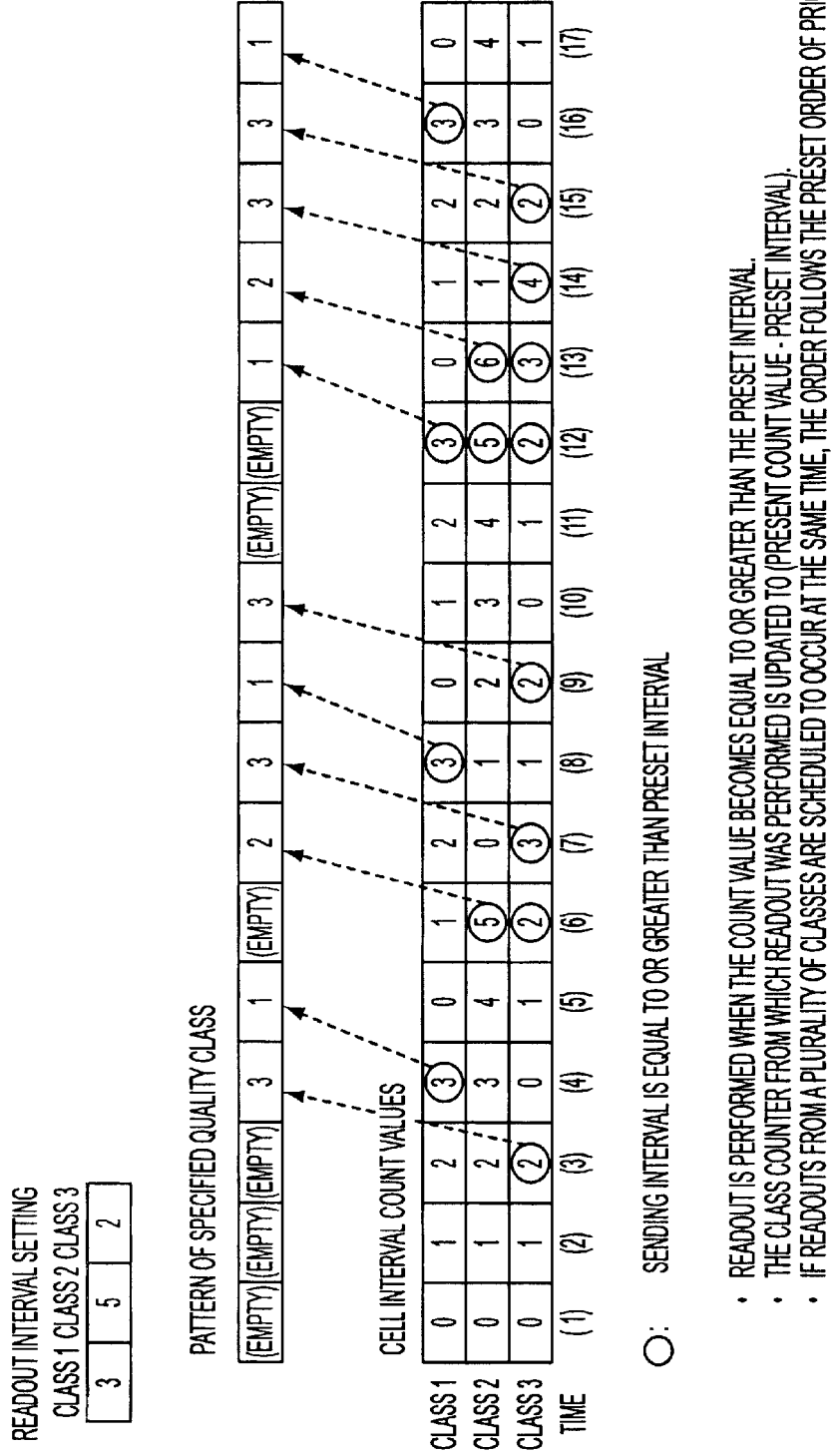
FIG. 12 is a diagram explaining the concept of the method of specifying a quality class based on the readout interval control method.

This method is basically the same as method A for specifying the ATM virtual connection, shown in FIG. 7. The concept of the method for specifying the quality class based on the Read-Out Interval Control Method is shown in FIG. 12. This method does not consider the length of each short cell, so the control is simple, but there are cases in which each quality class band cannot be accurately controlled.

Method b: Credit Method #1

Figure 13:
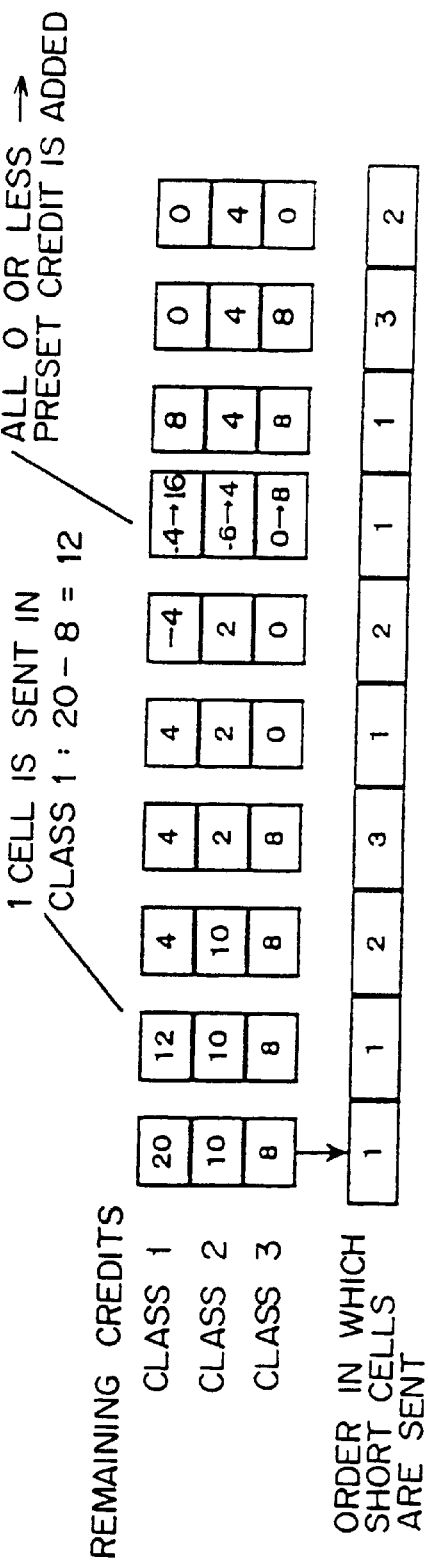
FIG. 13 is a diagram explaining the concept of the method of specifying a quality class based on credit method #1.

This method is basically the same as Method B for specifying an ATM virtual connection, shown in FIG. 8. However, in this method the credit is set separately for each quality class. At this time, the credit is set in units of bytes. In addition, if, by setting a certain quality class, one short cell is read out from the buffer corresponding to that quality class, the length of that short cell is subtracted from the credit for that quality class. The concept of the method of specifying quality class based on Credit Method #1 is shown in FIG. 13.

Method c: Credit Method #2

Figure 14:
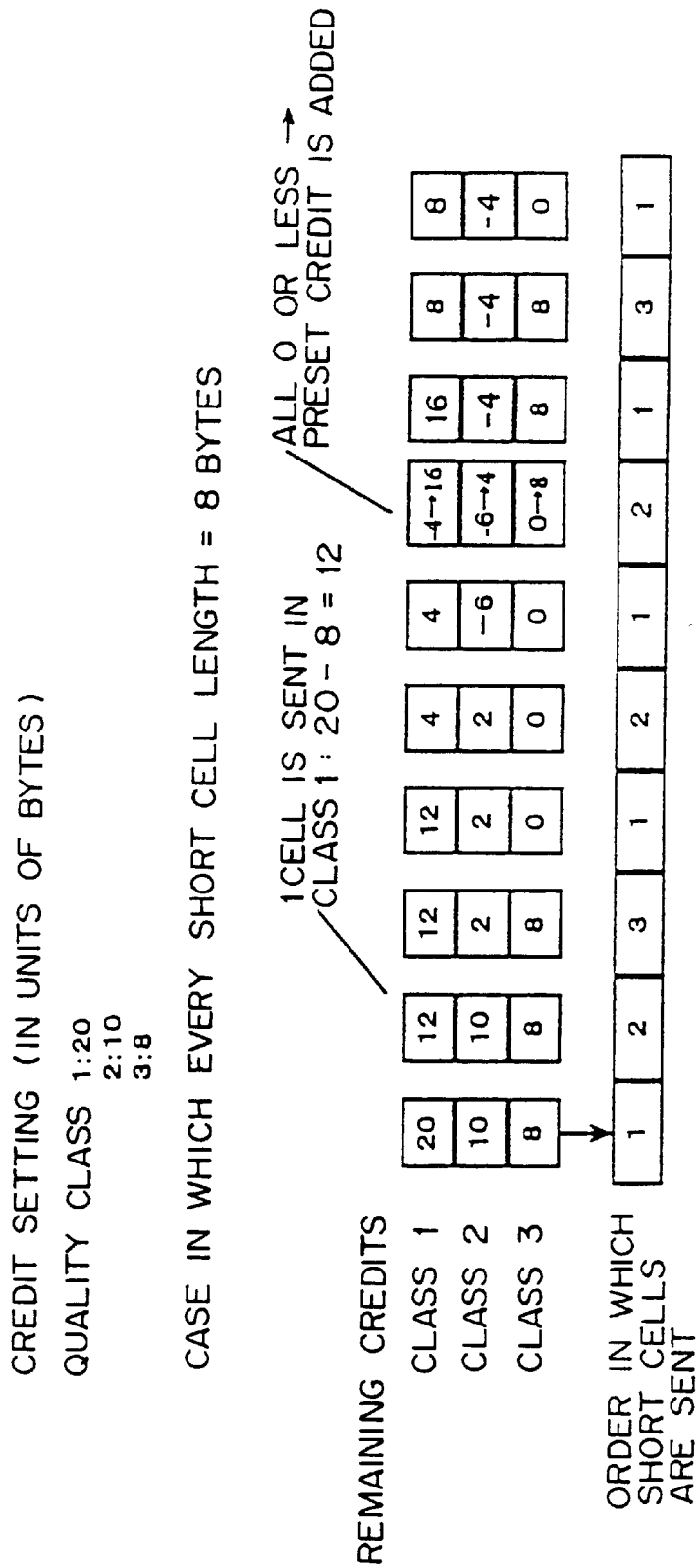
FIG. 14 is a diagram explaining the concept of the method of specifying a quality class based on credit method #2.

This method is basically the same as Method C for specifying an ATM virtual connection, shown in FIG. 9. However, the credit setting method and the calculation method are the same as in Method b described above. The concept of the method of specifying quality class based on Credit Method #2 is shown in FIG. 14.

Method d: Byte Interval Method

This method is basically the same as Method D for specifying an ATM virtual connection shown in FIG. 10. However, in this method the band ratio is set separately for each quality class. The concept of the method of specifying quality class based on the Byte Interval Method is shown in FIG. 15.

The inventor who is applying for this invention has already applied for a patent (Japanese Patent Application (TOKUGANHEI) No. 09-247091, applied for on Sep. 11, 1997) that is related to the action of the read-out sequence control section 35. That patent application should be referred to for details of the configuration and action of the read-out sequence control section 35.

Let us now describe the details of the configuration and action of the multiplexing unit of this invention.

FIG. 16 is a detailed configuration diagram of the short cell multiplexing unit of this embodiment. Here, the number of ATM virtual connections that are the object of multiplexing of short cells that have arrived is 5; also, one or another of 3 possible quality classes is set for each short cell.

The identifier latch section 41 has a different configuration depending on whether it is set up within the multiplexing unit 22 or the multiplexing unit 11. If it is set up within the multiplexing unit 22, when a short cell arrives the identifier latch section 41 latches the CID stored in the header of that short cell in order to identify the quality class to which that short cell belongs. On the other hand, if it is set up within the multiplexing unit 11, each short cell is processed in the data format shown in FIG. 4C, so the identifier latch section 41 latches the CID stored in the header of that short cell and the VPI/VCI of the ATM cell shown in FIG. 4C.

Figure 17A:
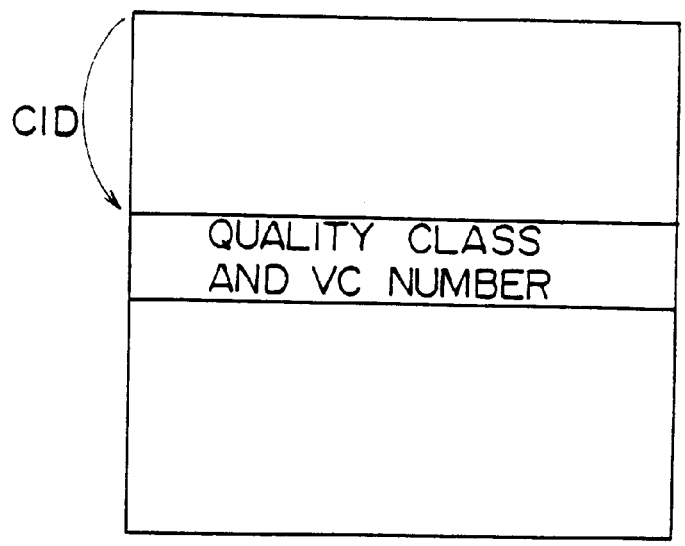
FIGS. 17A and 17B are configuration diagrams of the quality class storage memory.

The quality class storage memory 42 stores information that indicates which quality class each short cell belongs to. The configuration of the quality class storage memory 42, like that of the identifier latch section 41, differs depending on whether it is set up within the multiplexing unit 22 or the multiplexing unit 11. If the quality class storage memory 42 is set up within the multiplexing unit 22, then, as shown in FIG. 17A, stores the quality class and the VC number corresponding to each CID, using the CID as the key. This correspondence relationship is, for example, determined at the time the call is established. That is to say, the quality of each short cell connection is determined by negotiation between the terminal and the ATM network at the time the call is established. In addition, the correspondence relationship between each short cell connection and the ATM virtual connection that should multiplex that short cell connection is also determined by negotiation between the terminal and the ATM network at the time the call is established.

Figure 17B:
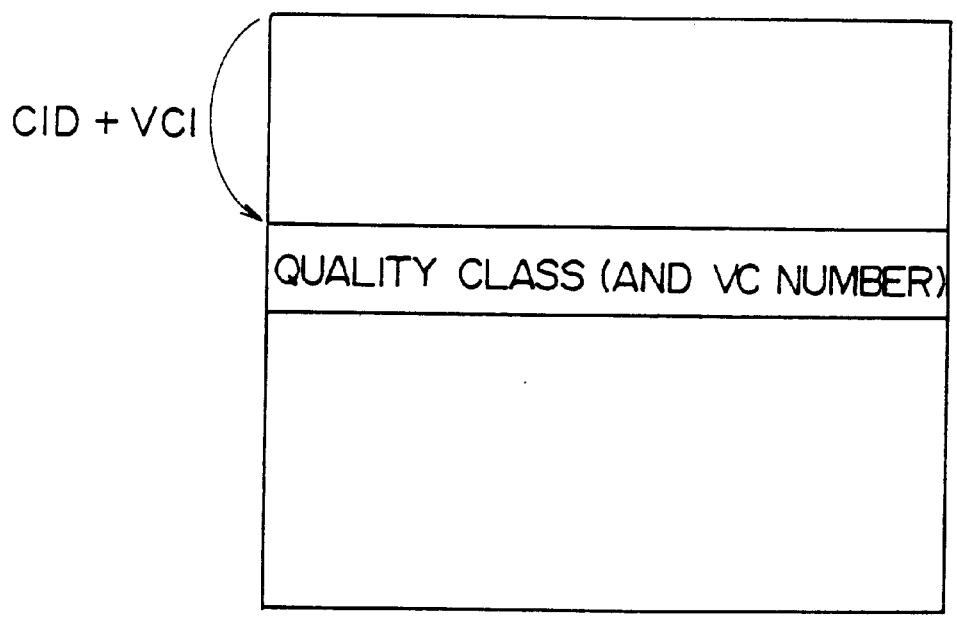

Meanwhile, if the quality class storage memory 42 is set up within the multiplexing unit 11, then, as shown in FIG. 17B, it stores the quality class corresponding to each CID with the combination of the CID and VPI/VCI as the key. This correspondence relationship is determined at the time the call is established.

Consequently, when a short cell arrives at this short cell multiplexing device, the quality class storage memory 42 is searched, with the CID (or the CID+VPI/VCI) of that short cell as the key, and the quality class of that short cell is identified. At this time, the VC number that identifies the ATM virtual connection in which that short cell is to be multiplexed is detected at the same time. The identified quality class and VC number are posted to the write-in control section 43.

A buffer memory for the purpose of storing short cells that arrive is set up for each ATM virtual connection accommodated in this short cell multiplexing device. Here, the buffer memories 44-1 to 44-5 are set up in the corresponding ATM virtual connections VC#1 to VC#5, respectively. Further, each of the buffer memories 44-1 to 44-5 consists of the memories 45-1 to 45-3, set up for each of the respective quality classes. Each of the respective memories 45-1 to 45-3 has a write-in pointer (WP) and read-out pointer (RP), respectively. The write-in pointer is the write-in address at which the next short cell is to be written in; the read-out pointer is the address from which the next short cell is to be read out.

The write-in control section 43 writes arrived short cells into the FIFO memories in accordance with the quality classes and the VC numbers of those short cells. For example, if the ATM virtual connection to which a short cell that has arrived is to be output is VC#1 and the quality class of that short cell is "class 1", the write-in control section 43 writes that short cell into the memory 45-1 inside the buffer memory 44-1. The memory write-in address is recognized by the write-in pointer. Consequently, if another short cell has already been written in, the next short cell is written in to the address area to which the write-in pointer points.

The processing when short cells are read out from the buffer memories 44-1 to 44-5 can be roughly summarized as follows.

1. Read-out processing starts in coordination with the cell assembly timing. The cell assembly timing is the timing at which this short cell multiplexing device assembles each ATM cell and sends it out. The cell assembly timing is synchronized with the timing at which cell frame signals are transmitted on the transmission path that has been established on the ATM virtual connections that are accommodated in this short cell multiplexing device. When a cell assembly timing signal is input, the VC specification control section 46 specifies a VC number that identifies the ATM virtual connection to which ATM cells are to be sent; in addition, the sequence specification control section 47 specifies the quality class of the short cells which are to be read out.

2. A short cell is read out of the memory corresponding to the specified VC number and quality class.

3. When one short cell has been read out, the system investigates whether or not any open area remains in the payload of the ATM cell in which that short cell is stored; if an open area remains, a request is made to the sequence specification control section 47 to specify the quality class at which the next short cell is to be read out. When the next quality class specification is received from the sequence specification control section 47, a short cell is read out in accordance with that specification. At this time, the VC specification control section 46 does not specify the next VC number. Consequently, the ATM virtual connection in which the short cell that is read out is to be multiplexed does not change. This action is repeated until there is no more open area left in the ATM cell payload.

4. If, in step 3 above, the total of the lengths of the short cells read out from the memory is equal to or greater than the ATM cell payload length, that ATM cell is sent out onto the ATM virtual connection corresponding to the VC number specified by the VC specification control section 46. Here, if the total of the lengths of the short cells read out from the FIFO memory is greater than the length of the ATM cell payload, and not all of the short cells could be multiplexed within that ATM cell payload, the data that could not be multiplexed (part of the last short cell that was read out) is held over to be stored in the next ATM cell.

In FIG. 16, the short cell data read out from the short cell storage memory (buffer memories 44-1 to 44-5) are multiplexed onto a path by the selector 49 (SEL1). The selection signal for the selector 49 is a combination of the VC number and the quality class that was used when a short cell was read out.

The length information latch section 50 latches the length information LI stored in the header of each short cell output from the selector 49 and posts it to the readout control section 48. The ATM cell header assembly section 51 creates an ATM header that includes the VPI/VCI corresponding to the VC number specified by the VC specification control section 46. The ATM cell header assembly section 51 outputs the ATM header that was created; then, by controlling the selector 52 (SEL2) with suitable timing so that the short cell data corresponding to that ATM cell header are output, the ATM cell is sent to the ATM virtual connection specified by the VC specification control section 46. The ATM cell that is output at this time has the data configuration shown in FIG. 4B. In FIG. 16, the function that stores the start field shown in FIG. 4B is omitted.

Next, let us explain the details of the processing by which short cells are read out from the short cell storage memory (buffer memories 44-1 to 44-5).

VC Specification Control

The VC specification control section 46 specifies the VC number corresponding to the ATM virtual connection to which ATM cells should be sent at each timing at which an ATM cell is sent in accordance with methods A to E that were explained referring to FIG. 7 to FIG. 11A and FIG. 11B. Then the VC specification control section 46 posts that VC number to the sequence specification control section 47, the readout control section 48 and the ATM cell header assembly section 51. The detailed configuration and action of the VC specification control section 46 will be discussed below.

Quality Class Specification Method

Quality class specification is executed by the sequence specification control section 47. The sequence specification control section 47 receives the VC number specified by the VC specification control section 46 and specifies the quality class of the short cell to be multiplexed on the ATM virtual connection corresponding to that VC number. The quality class is specified similarly when there is a specification request from the readout control section 48. The method of specifying the quality class was explained with reference to FIG. 12 to FIG. 15; a more detailed explanation is given in Japanese Patent Application (TOKUGANHEI) No. 09-247091.

Readout Control Section

The readout control section 48 performs processing for the purpose of reading out 1 short cell, from the corresponding FIFO memory, in accordance with the VC number specified by the VC specification control section 46 and the quality class specified by the sequence specification control section 47. The FIFO memory readout address is found from the readout pointer (RP) corresponding to that FIFO memory.

Figure 18:
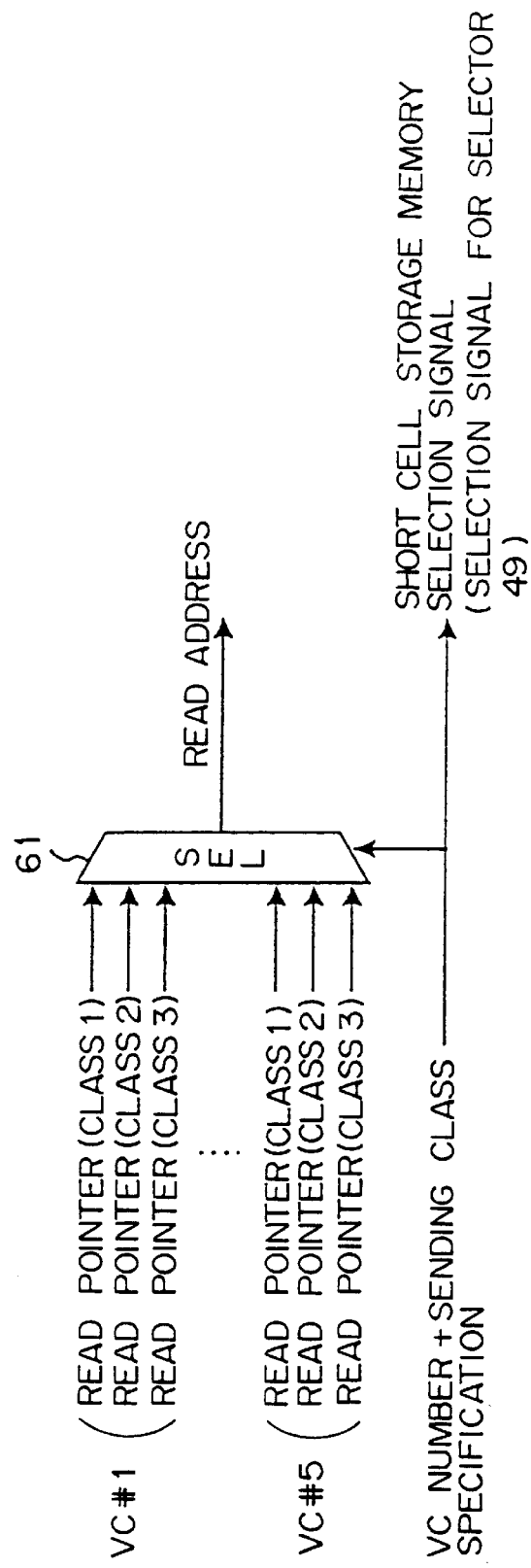
FIG. 18 is a diagram showing an example of configuration of a unit that creates readout addresses.

FIG. 18 shows an example of the configuration of the unit that creates the readout address. This unit has the selector 61. The readout pointers corresponding to each of the FIFO memories in the buffers 44-1 to 44-5 are input into the selector 61. The selection signal for the selector 61 is a combination of the VC number specified by the VC specification control section 46 and the quality class specified by the sequence specification control section 47. The desired readout address is obtained by controlling the selector 61 with this selection signal. For example, if "VC number=#1" and "quality class=1" is input as the selection signal, the selector 61 outputs the readout pointer corresponding to the FIFO memory 45-1 of the buffer memory 44-1 as the readout address. This VC number becomes the upper level address of the selection signal for the selector 61 (the selection signal of the short cell storage memory), and this quality class number becomes the lower level address of that selection signal.

A short cell is a variable length packet. Consequently, when a short cell is stored in an ATM cell, it is necessary to recognize the length of each short cell and judge whether or not the next short cell can be stored in that ATM cell, based on that length information. The method used to make this judgment is explained below.

A shown in FIG. 4A, the length of each short cell is shown as LI in that cell's header. This length information is detected by the length information latch section 50 when each short cell is read out from the buffer; and posted to the readout control section 48. This permits the readout control section 48 to recognize the number of bytes in a short cell read out from the buffer memory.

Every time short cells read out from the buffer memory are stored in an ATM cell payload, the readout control section 48 detects the number of bytes of area remaining in that payload, and computes the remaining number of bytes by subtracting the number of bytes in the short cell from that detected number of bytes. If the number of bytes of area remaining in the ATM cell payload is greater than 0, it is judged that the next short cell can be written into the ATM cell payload, and the sequence specification control section 47 is requested to specify the next quality class. Meanwhile, if the computed remaining number of bytes is negative, the number of bytes of data corresponding to that negative value (part of the last short cell that was read out) consists of data that were not stored in that ATM cell payload, so those data are held, along with the number of bytes and the quality class. Then, when the next ATM cell to be sent to the same virtual connection as that ATM cell is created, the part of the short cell that was not stored in the previous ATM cell payload is mapped from the start of the payload of the next ATM cell (excepting the start field). When the number of remaining bytes in the ATM cell payload is exactly 0, no processing is carried out.

Figure 19:
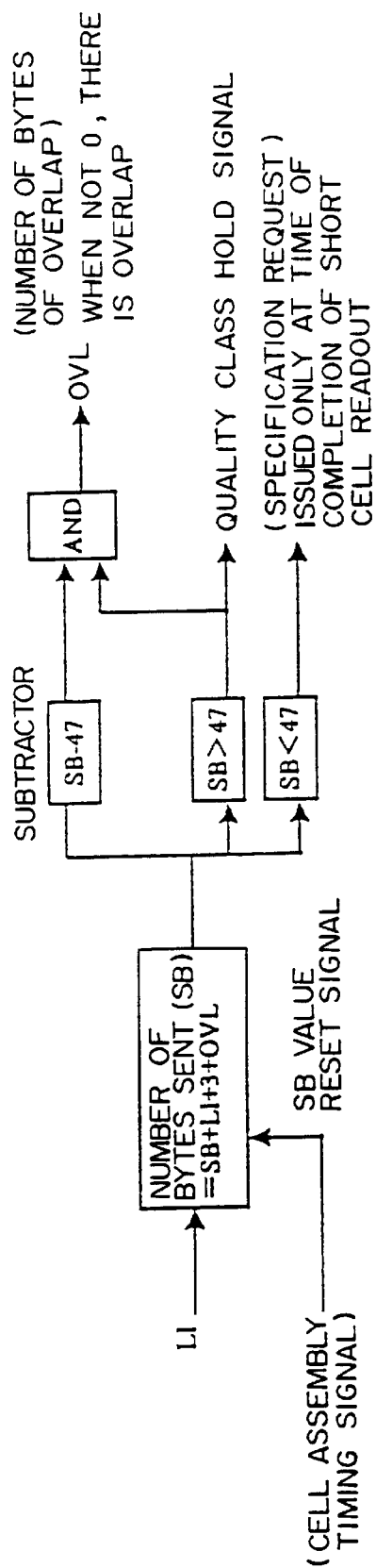
FIG. 19 is a diagram showing an example of configuration of a unit that executes the processing when an overlap is detected.

FIG. 19 shows an example of the configuration of the unit that executes the processing when overlap is detected. Here, the short cell header is taken to consist of 3 bytes. If the short cell header is assumed to consist of 3 bytes, the length of the short cell read out of the buffer memory is LI+3. Here, LI is a parameter that indicates the length of the short cell payload. Note that in this specification of the patent application, in order to simplify the explanation the short cell length is taken to be LI+3, but in I363.2 of ITU-T, it is prescribed that "LI=0 indicates a payload length of 1 byte". Consequently, if the LI value is used as is in accordance with the ITU-T recommendation, the "short cell length" becomes LI+3+1.

In addition, if the total number of bytes stored in the payload of the ATM cell that was previously read out is SB, and if the overlap from the previous ATM cell (when there is overlap) is taken to be OVL, the total SB of the number of bytes that have been stored in an ATM payload including the present short cell can be expressed as follows. Note that the "overlap" is the situation in which part of a short cell is stored in one ATM cell, and the rest of that short cell is stored in another ATM cell.

$$SB=SB+LI+3+OVL(bytes)$$

If the ATM cell payload is taken to consist of 47 bytes, when SB computed by the above formula is less than 47, it means that there is still open space in the payload, so a request for specification is issued to the sequence specification control section 47. When SB is exactly 47, it means that the present short cell mapping results in the number of open bytes in the payload being exactly 0, so no processing is carried out. If SB exceeds 47, it means that overlap is occurring because of this short cell mapping, so the quality class number of the short cell that was read out immediately preceding is held until the time of the next readout. The number of bytes of overlap is calculated as SB–47, and this is held as the OVL value. Then the part of the short cell that could not be stored in that ATM cell is mapped to the start of the next ATM cell payload. The total number of bytes SB is reset when assembly of a new ATM cell starts.

Figure 20:
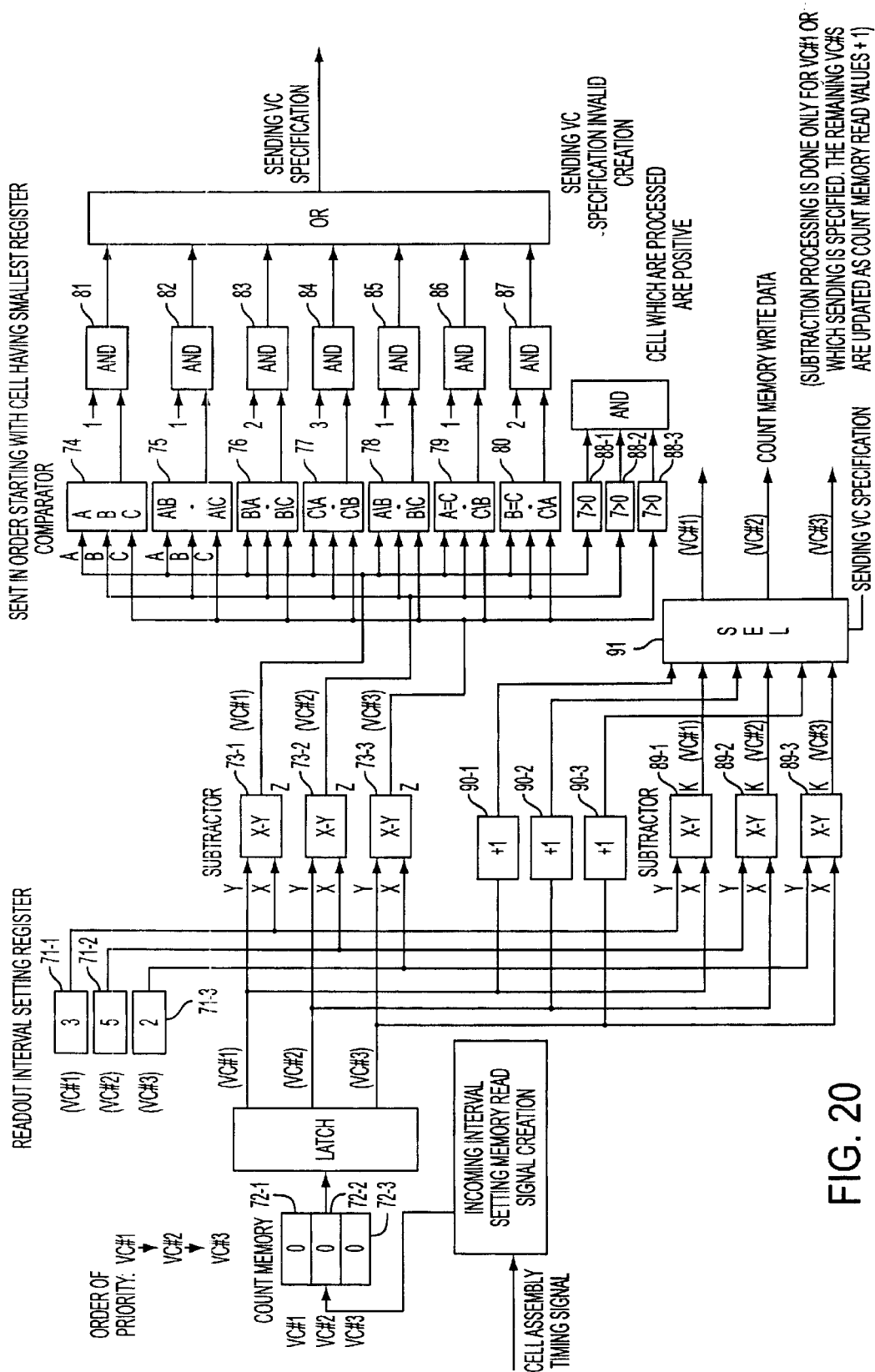
FIG. 20 is a configuration diagram of the VC specification control section for the purpose of realizing the method shown in FIG. 7 in practice.
Figure 21:
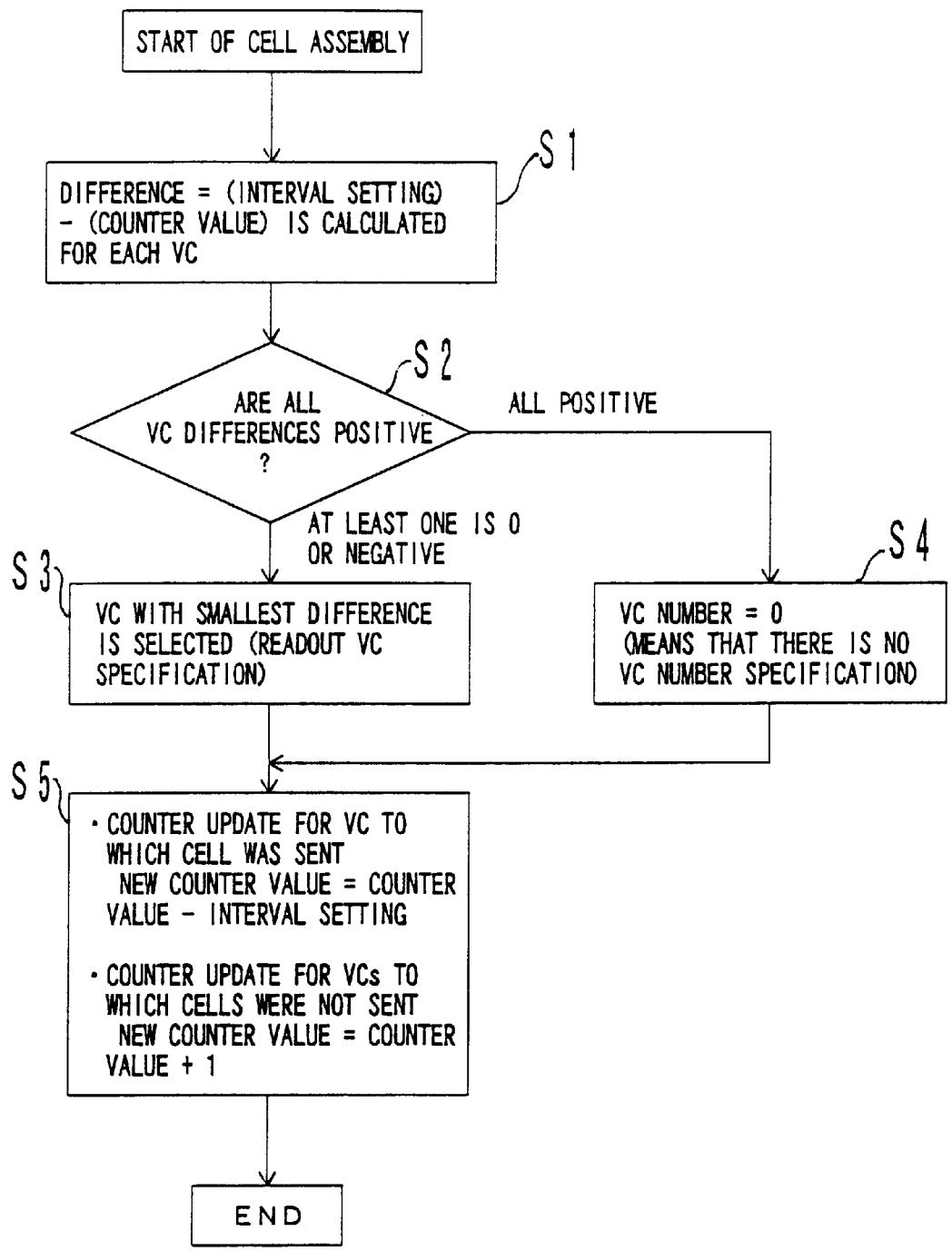
FIG. 21 is a flowchart explaining the action of the VC specification control section shown in FIG. 20.

Next, let us explain the configuration and action of the VC specification control section 46 in detail. FIG. 20 is a configuration diagram of the VC specification control section for the purpose of realizing method A shown in FIG. 7. FIG. 21 is a flow chart that explains the action of the VC specification control section shown in FIG. 20. Here, there are 3 ATM virtual connections (VC#1 to VC#3) to which ATM cells in which short cells are stored are to be sent; their order of priority is #1–#2–#3. The readout intervals that are preset for VC#1 to VC#3 are 3, 5, 2 respectively. These settings are stored in the readout interval setting registers 71-1 to 71-3, respectively, in units of time slots allotted to 1 ATM cell.

This VC specification control section has the count memories 72-1 to 72-3 for the purpose of counting the timings of each ATM virtual connection. The count values in the count memories 72-1 to 72-3 are incremented 1 at a time, respectively, every time an ATM cell is sent.

The subtractors 73-1 to 73-3 subtract the count values stored in the count memories 72-1 to 72-3 from the settings set in the readout interval setting registers 71-1 to 71-3, respectively to create Z(#1) to Z(#3). The comparators 74 to 80 output control signals determined in accordance with the relative magnitudes of Z(#1) to Z(#3). For example, if Z(#1)<Z(#2) and Z(#1)<Z(#3), that is to say, if Z(#1) is the smallest among Z(#1) to Z(#3), the comparator 75 outputs a control signal for the purpose of opening the AND gate 82. Only one of the comparators 74 to 80 outputs a control signal for the purpose of opening a corresponding AND gate.

One of the inputs to each of the AND gates 81 to 87 is a specified value that is applied to each of the respective AND gates. These values are the VC numbers. For example, "#1# is applied to the AND gate 82 as the VC number. Then, the AND gates among the AND gates 81 to 87 that receive "H" as the control signal from the corresponding comparators among the comparators 74 to 80 output the VC number that has been set. In this way one VC number is specified. The VC number that is specified here is called the sending VC specification signal.

Each of the comparators 88-1 to 88-3 that calculates a positive value of Z among Z(#1) to Z(#3) outputs "H". If the outputs of all of the comparators 88-1 to 88-3 are "H", then a signal that voids the specified VC number is output.

The subtractors 89-1 to 89-3 subtract the settings that have been set in the readout interval setting registers 71-1 to 71-3 from the counts that are stored in the count memories 72-1 to 72-3, respectively, to generate K(#1) to K(#3). The adders 90-1 to 90-3 each adds 1 to the count stored in the respective count memories 72-1 to 72-3. The selector 91 selects one or more of the subtractors 89-1 to 89-3 and one or more of the adders 90-1 to 90-3 for each ATM virtual connection in accordance with the specified VC number. For example, if the VC specification signal that was sent is "#1", the selector 91 selects the output of the subtractor 89-1 and the outputs of the adders 90-2 and 90-3. The output of the selector 91 is transferred to the count memories 72-1 to 72-3. Then the counts in each of the count memories 72-1 to 72-3 are updated by the output of the selector 91. That is to say, the count in the count memory corresponding to the specified VC number is updated to the value obtained by subtracting the setting set in the readout interval setting register from the present value. The counts in the other count memories are updated to the value obtained by adding 1 to the present value.

Let us now explain the action of the VC specification control section in the configuration described above, referring to FIG. 21. The processing in this flow chart is executed at every timing at which this short cell multiplexing device sends an ATM cell.

In step S1, for each ATM virtual connection, a value (a difference) computed by subtracting the present count stored in the count memories 72-1 to 72-3 from the setting values of the readout intervals set in the readout interval setting registers 71-1 to 71-3. Each count value essentially corresponds to the time elapsed since the timing at which the previous ATM cell was sent.

In step S2, the system investigates whether the differences computed in step S1 are positive or not. Here, for those differences to be positive indicates that, in the corresponding ATM virtual connections, the time that has elapsed since the previous ATM cell was sent essentially has not yet reached the preset interval.

If there exists a virtual connection for which the difference is 0 or less, then, in step S3, the ATM virtual connection for which the difference is smallest (for which the absolute value of the difference is largest) is selected. The VC number corresponding to this selected ATM virtual connection is output of the VC specification control section. If there are a plurality of differences that are equal to one another, the selection follows a preset order of priority. On the other hand, if all of the differences are positive, then, in step S4, "1" is output as a sending class specification invalid indication, and a VC number is not specified.

In step S5, the count memory corresponding to the VC number specified in the step S3 is updated to the value obtained by subtracting the readout interval setting set in the readout interval setting register from the present count. Then 1 is added to the counts in those of the count memories 72-1 to 72-3 that correspond to VC numbers that were not specified.

In step S3, if a condition is reached in a plurality of ATM virtual connections in which ATM cells should be sent, only one of those ATM virtual connections is selected, so even though a condition in which an ATM cell should be sent has been reached ATM cells are not actually sent to the other ATM virtual connections that were not specified. That is to say, the actual interval between sending of ATM cells becomes longer than the set value. However, in this case, in those ATM virtual connections to which ATM cells are not sent, the next interval becomes shorter by the same amount that the previous interval became longer, so the result is that the preset band is maintained.

Figure 22:
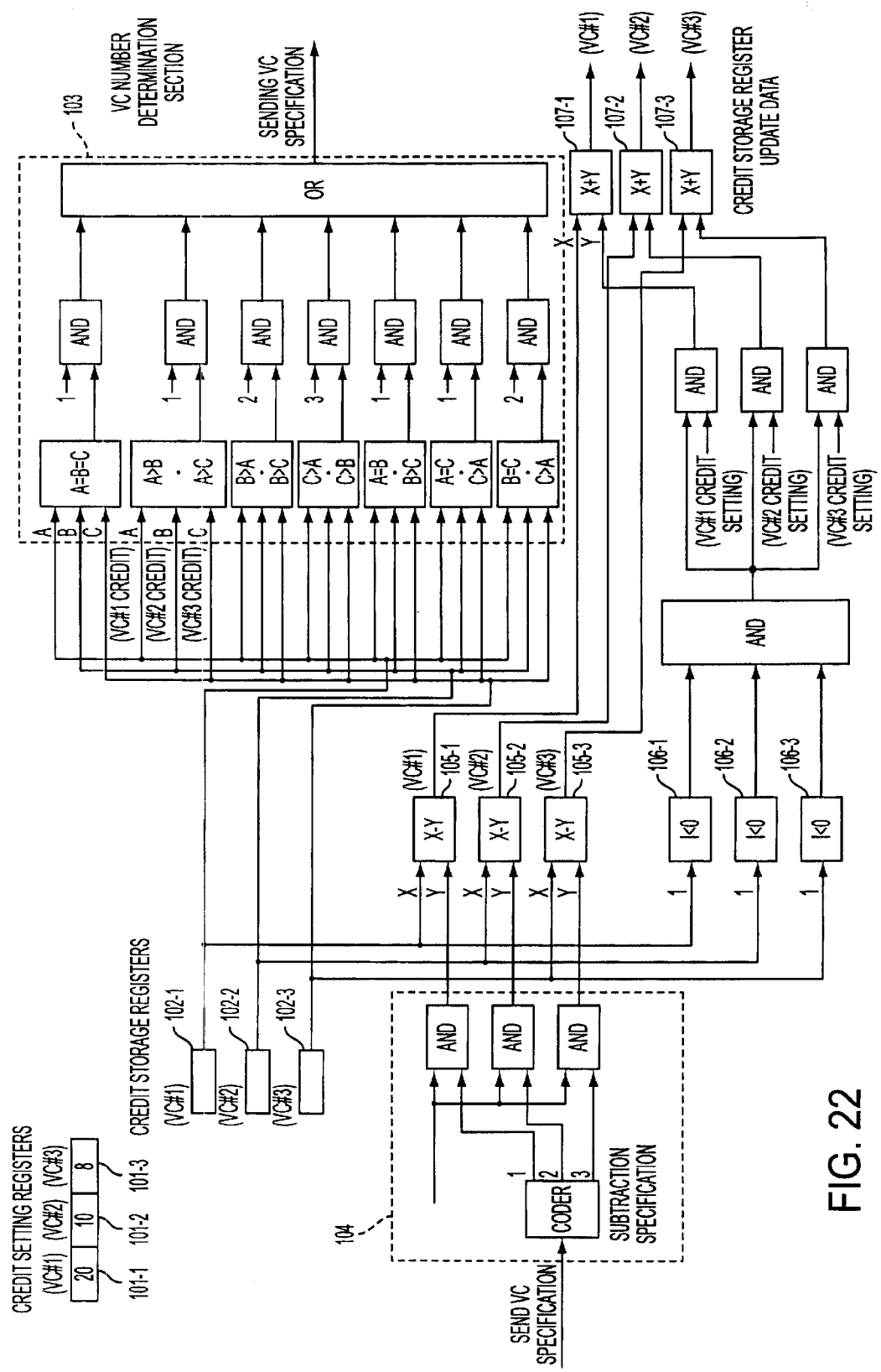
FIG. 22 is a configuration diagram of the VC specification control section for the purpose of realizing the method shown in FIG. 8 in practice.

FIG. 22 is a configuration diagram of the VC specification control section for realizing method B shown in FIG. 8. This VC specification control section has a configuration in which the credit method is adopted; specifications are made in order starting from the ATM virtual connection with the largest credit.

The credit setting registers 101-1 to 101-3 are set up in the respective ATM virtual connections, and credit values are preset in them. In addition, the credit storage registers 102-1 to 102-3 are set up in the respective ATM virtual connections, and credit values that have been updated as ATM cells are read out are written into them. The credit storage registers 102-1 to 102-3 can be of such a form that they use special areas in memory.

The VC number determination section 103 is basically the same as the unit shown in FIG. 20 that consists of the comparators 74 to 80, the AND gates 81 to 87 and an OR gate. However, the VC number determination section 103 outputs VC numbers in accordance with the relative magnitudes of the credits corresponding to each of the ATM virtual connections. Further, the comparison condition that is set in the VC number determination section 103 is different from the comparison condition that is set in the comparators 74 to 80 shown in FIG. 20. The VC number determination section 103 outputs the VC number that identifies the ATM virtual connection corresponding to the credit storage register in which the largest credit value is stored.

The subtractors 105-1 to 105-3 subtract the values specified by the subtraction specification section 104 from the credit values stored in the respective credit storage registers 102-1 to 102-3. The subtraction specification section 104 outputs "1" for the ATM virtual connection corresponding to the VC number specified by the VC number determination section 103, and outputs "0" for the other ATM virtual connections. The outputs of the subtractors 105-1 to 105-3 are used to update the credit storage registers 102-1 to 102-3. Consequently, the value in the credit storage register corresponding to the ATM virtual connection specified by the VC number determination section 103 is decremented by 1, while the values in the other credit storage registers remain as they are.

The comparators 106-1 to 106-3 output "H" when the credit values stored in the respective credit storage registers 102-1 to 102-3 are 0 or less. If the outputs of the comparators 106-1 to 106-3 are all "H", then the adders 107-1 to 107-3 add the credits set in the credit setting registers 101-1 to 101-3 to the outputs of the respective subtractors 105-1 to 105-3. Then the values in the credit storage registers 102-1 to 102-3 are updated by the respective adders 107-1 to 107-3. That is to say, when the credits stored in the credit storage registers 102-1 to 102-3 are all 0 or less, basically the credit values set in the credit setting registers 101-1 to 101-3 are written into the respective credit storage registers 102-1 to 102-3.

Figure 23:
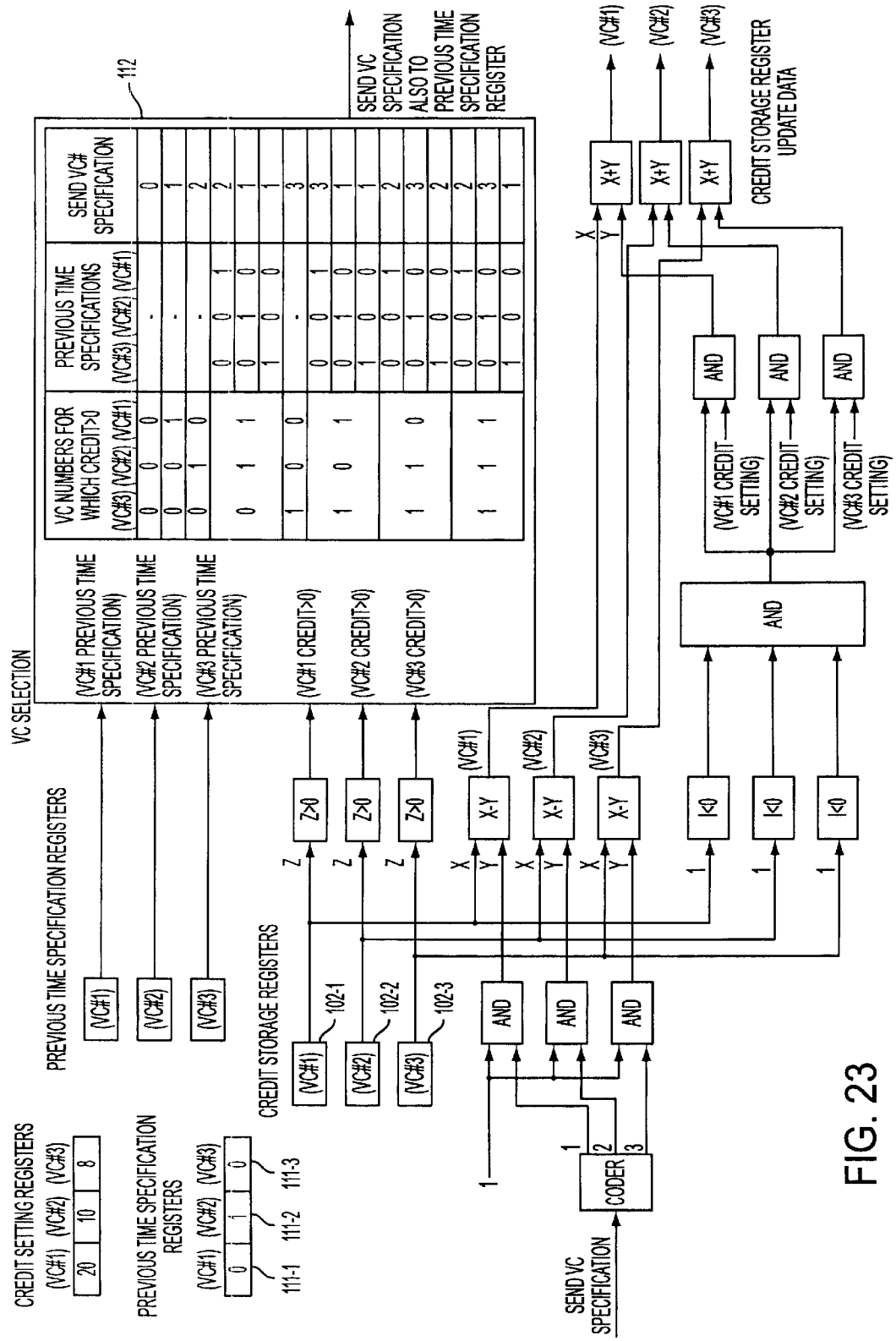
FIG. 23 is a configuration diagram of the VC specification control section for the purpose of realizing the method shown in FIG. 9 in practice.

FIG. 23 is a configuration diagram of the VC specification control section for realizing method C shown in FIG. 9. This VC specification control section has a configuration that adopts the credit method; VC numbers are specified in sequence for ATM virtual connections that have positive credit values.

In the configuration shown in FIG. 23, in order to make sure that the same VC number is not specified 2 or more times in a row, the previous time specification registers 111-1 to 111-3 are provided in each of the ATM virtual connections. The previous time specification registers 111-1 to 111-3 store information that indicates whether or not the corresponding VC number was specified in the immediately previous time's VC number specification processing. For example, in FIG. 23, the case in which "#2" was specified in the immediately previous time's processing is shown.

The VC selection section 112 selects the VC number in accordance with the signal that indicates the values that are stored in the previous time specification registers 111-1 to 111-3 and whether or not the credit values that are stored in the credit storage registers 102-1 to 102-3 are positive. The VC selection processing that is executed by the VC selection section 112 is according to the table shown in FIG. 23. The processing shown in this table can, for example, be realized by a hardware circuit, or it can equally well be realized by software. The sending VC specification that is the output of the VC selection section 112 is also used as the signal for the purpose of updating the previous time specification registers 111-1 to 111-3.

Let us give an example. Suppose that the VC number that was specified the previous time is 2, and that the credit values for all of the ATM virtual connections are positive. This condition corresponds to the 2nd record from the bottom of the table, so in this case the VC selection section 112 specifies "#3" as the VC number.

In the VC specification control section shown in FIG. 23, the configuration for the purpose of updating the credit values is the same as that of the VC specification control section shown in FIG. 22.

Figure 24:
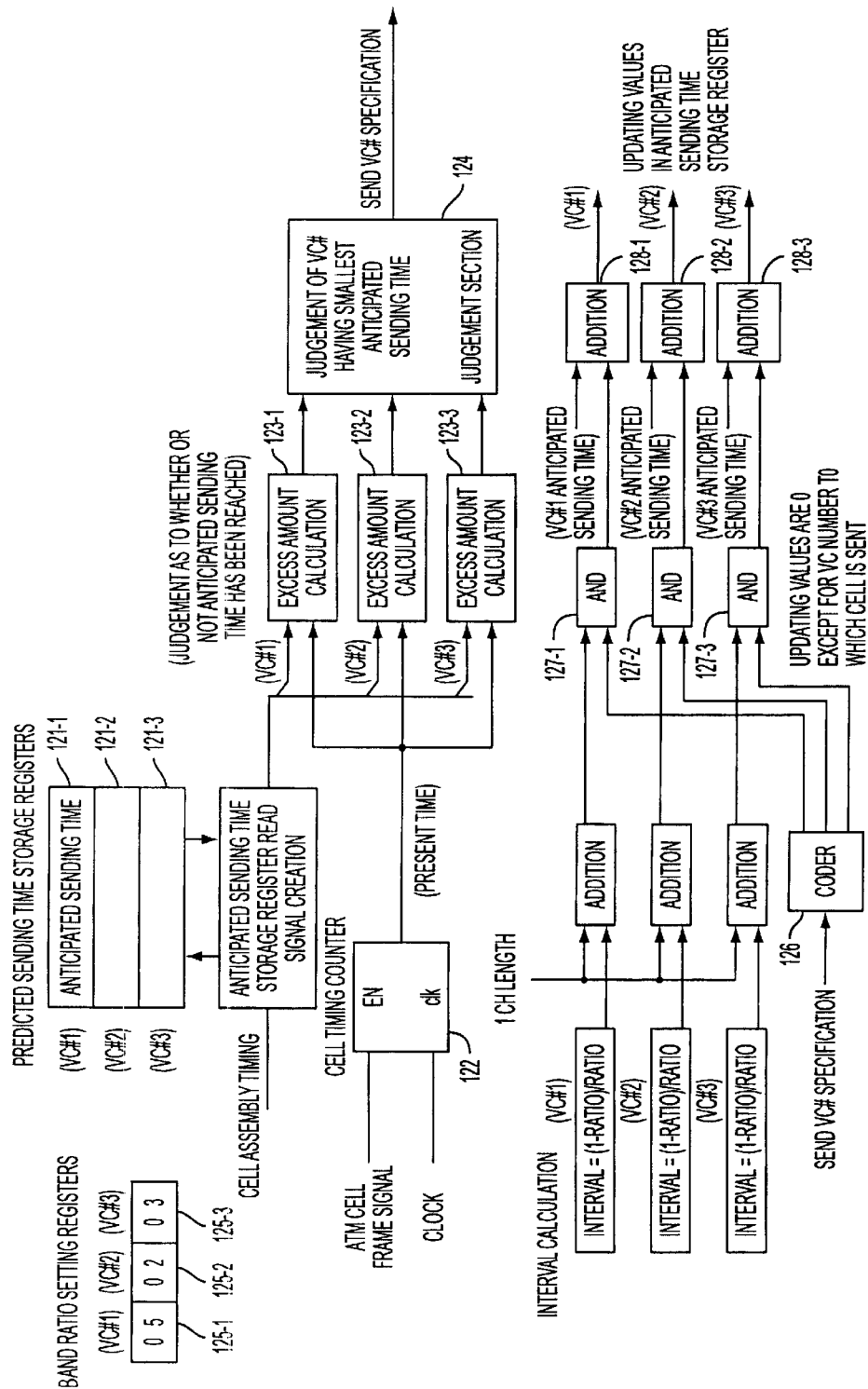
FIG. 24 is a configuration diagram of the VC specification control section for the purpose of realizing the method shown in FIG. 10 in practice.

FIG. 24 is a configuration diagram of a VC specification control section for the purpose of realizing method D shown in FIG. 10. This VC specification control section adopts the ATM cell sending interval specification method. Here we show a method that uses the absolute time.

The predicted sending time storage registers 121-1 to 121-3 are set up in the corresponding ATM virtual connections and store the time at which the next ATM cell should be sent. The cell timing counter 122 counts the number of ATM cell frame signals output from this short cell multiplexing device. This VC specification control section uses the count value in the cell timing counter 122 as the standard time.

The excess amount calculation sections 123-1 to 123-3 are set up in the corresponding ATM virtual connections, and compare the predicted times stored in the respective predicted sending time storage registers 121-1 to 121-3 to the standard time output by the cell timing counter 122. Then the judgment section 124 searches for an ATM virtual connection for which the present time has reached the anticipated sending time, referring to the results of the comparisons by the excess amount calculation sections 123-1 to 123-3. Then the ATM virtual connections are specified one at a time in order starting from the one for which the excess amount with respect to the anticipated sending time is largest.

When a VC number is specified, next the anticipated time at which the next ATM cell should be sent is calculated for each of the ATM virtual connections. The interval until the next anticipated time is calculated according to the following formula.

$$\text{interval} = (1 - \text{ratio})/\text{ratio}$$

Here, "ratio" is the ratio of the pre-allotted band with respect to each of the ATM virtual connections; the ratios are stored in the band ratio setting registers 125-1 to 125-3.

The anticipated time at which the next ATM cell is to be sent can be defined using the interval. That is to say, if a certain ATM cell is sent as expected at the anticipated sending time for that ATM cell, then the anticipated time at which the next ATM cell should be sent is as follows.

Next anticipated sending time=(time at which sending of present cell starts)+(interval+1)

In the configuration shown in FIG. 24, the anticipated time at which the next ATM cell is to be sent to the ATM virtual connection corresponding to the specified VC number is computed using the above formula, on the other hand, the 2nd term in the above formula is forcibly set to 0 for the anticipated times for sending the next ATM cell to the other ATM virtual connections, so that those anticipated sending times are not updated. That is to say, the coder 126 outputs a signal for the purpose of opening only the AND gate corresponding to the specified VC number. The AND gate specified by the coder 126, from among the AND gates 127-1 to 127-3, outputs "interval+1"; the other AND gates output "0". The adders 128-1 to 128-3 add the outputs of the AND gates 127-1 to 127-3 to the anticipated sending times stored in the respective anticipated sending time storage registers 121-1 to 121-3. Then the anticipated sending time storage registers 121-1 to 121-3 are updated by the outputs of the adders 128-1 to 128-3, respectively.

If a certain ATM cell cannot be sent exactly at the anticipated sending time, then, in the calculation of the next anticipated sending time, it is necessary to take the standard timing as the original anticipated sending time, so the following formula is used.

Next anticipated sending time=(anticipated sending time of the corresponding cell)+(interval+1)

In the configuration shown in FIG. 24, the information set in the band ratio setting registers 125-1 to 125-3 is the ratio of the sending bands allotted for each of the ATM virtual connections; it is sufficient to first calculate "(1−ratio)/ratio" and then use that calculated value. This value corresponds to the ATM cell sending interval. In this case, the processing in which the anticipated sending time is calculated can be simplified.

Also, in the configuration shown in FIG. 24, the cell timing counter 122 that counts the number of ATM cell frames is set up; the sending times are calculated by this counter using the absolute timing, but the relative timing can also be used to determine the anticipated ATM cell sending times.

FIGS. 25A and 25B are conceptual diagrams of the method of determining the anticipated sending time in the case in which absolute timing is used and the case in which relative timing is used. If the absolute timing is used, then, as shown in FIG. 25A, if, for example, an ATM cell is sent at time T1, then the next anticipated sending time T2 is T2=T1+B1; then the next anticipated sending time after that becomes T3=T2+B1. That is to say, the anticipated sending time for each ATM cell is computed using the actual sending time of one ATM cell as a reference, and then the sending interval is added successively to obtain subsequent sending times.

Meanwhile, if the relative timing is used, when each ATM cell is sent the next anticipated sending time is computed. For example, in a case in which the anticipated sending time is 5, as shown in FIG. 25B, it is conceivable that the ATM cell will actually be sent at time 6. Here, the next anticipated sending time is computed with time 6 as the reference time; the ATM cell that is sent at time 6 is sent 1 cell time later than the anticipated time. In this case, the next anticipated cell sending time is given by the following formula, with the time at which sending of the ATM cell starts as the reference time.

Next anticipated sending time=(sending interval)−(actual sending time of this ATM cell−anticipated sending time of this ATM cell)

In the example shown in FIG. 25B, we have:

$$T3=B1-(S2-T2))=4-(6-5)=3$$

That is to say, the anticipated sending time of the next ATM cell is 3 cell times after the actual sending time of this ATM cell.

Figure 26B:
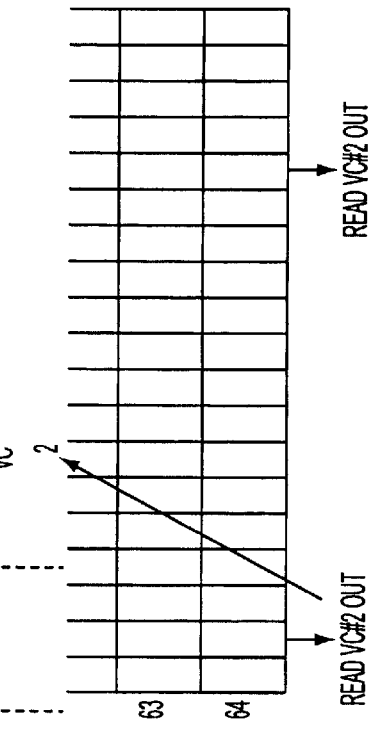
FIGS. 26A and 26B are diagrams showing one example of a VC specification method.
Figure 26A:
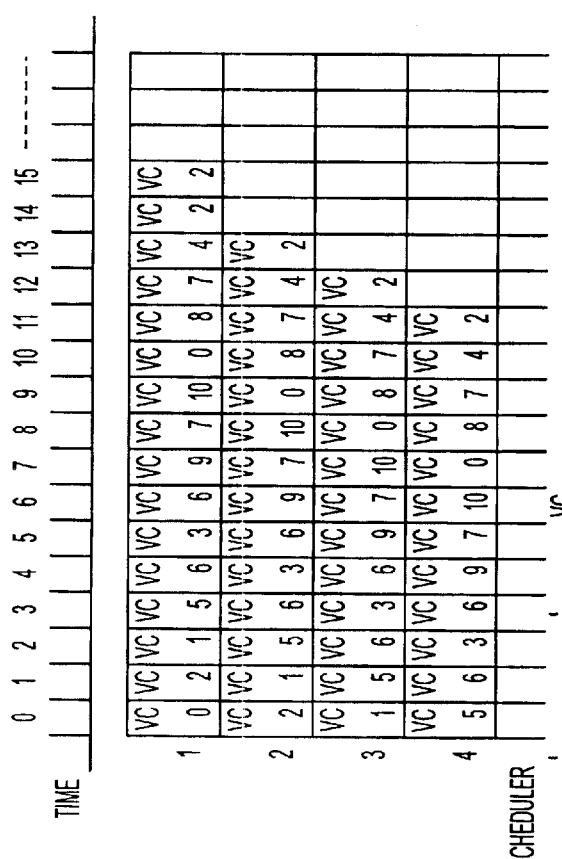

FIG. 26A shows a more specific example of the action of method E shown in FIGS. 11A and 11B. This figure shows the situation when the VC scheduler is successively updated as time elapses. For example, if "#0" is read out at time 0, the VC numbers that were not read out from the VC scheduler corresponding to time 0 are written into the scheduler corresponding to time 1.

Let us now explain the action at time 1 in detail. From the start, "#2", "#1", "#5" and "#6" are stored in the scheduler corresponding to time 1 in that order. When the time comes to time 1, first the one VC number that is stored at the start of this scheduler is read out. That is to say, "#2" is read out. This VC number is the output of the VC specification control section 46.

Next, using the VC number that was read out from the scheduler corresponding to time 1 as a key, the anticipated sending time datum and the cell sending interval datum are fetched from the time management table and the cell interval management table shown in FIG. 26B. Then the anticipated time at which the next ATM cell is to be sent is computed by adding the cell sending interval datum to the anticipated sending time datum. In this example, 1.7+5=6.7 is obtained. The time management table is updated by this computed value. Then this VC number is stored at the tail end of the scheduler corresponding to the integer part of that computed value. In this example, INT(6.7)=6 is obtained, so "#2# is stored at the tail end of the scheduler corresponding to time 6.

Here, let us assume that 8 VC numbers were already stored in the scheduler corresponding to time 6. In this particular case, "#2" will be read out at time 14. Consequently, let us explain the action at time 14 in detail.

When "#2" is read out at time 14, with this VC number as a key the anticipated sending time datum and the cell sending interval datum will be fetched from the time management table and the cell interval management table shown in FIG. 26B. Here, "6.7" is stored as the anticipated sending time datum. Consequently, when the next anticipated cell sending time is computed by adding the cell sending interval datum to the anticipated sending time datum, 6.7+5=11.7 is obtained.

However, the present time is time 14, which exceeds this anticipated sending time. That is to say, this anticipated sending time is meaningless. In this case, the anticipated time at which the next ATM cell is to be sent is set to the nearest possible future time. In this example, 1 is added to the present time to obtain time 15 as the next anticipated sending time. Then "15" is written into the time management table, and in addition "#2" is written into the scheduler corresponding to time 15.

Figures 27A, 27B:
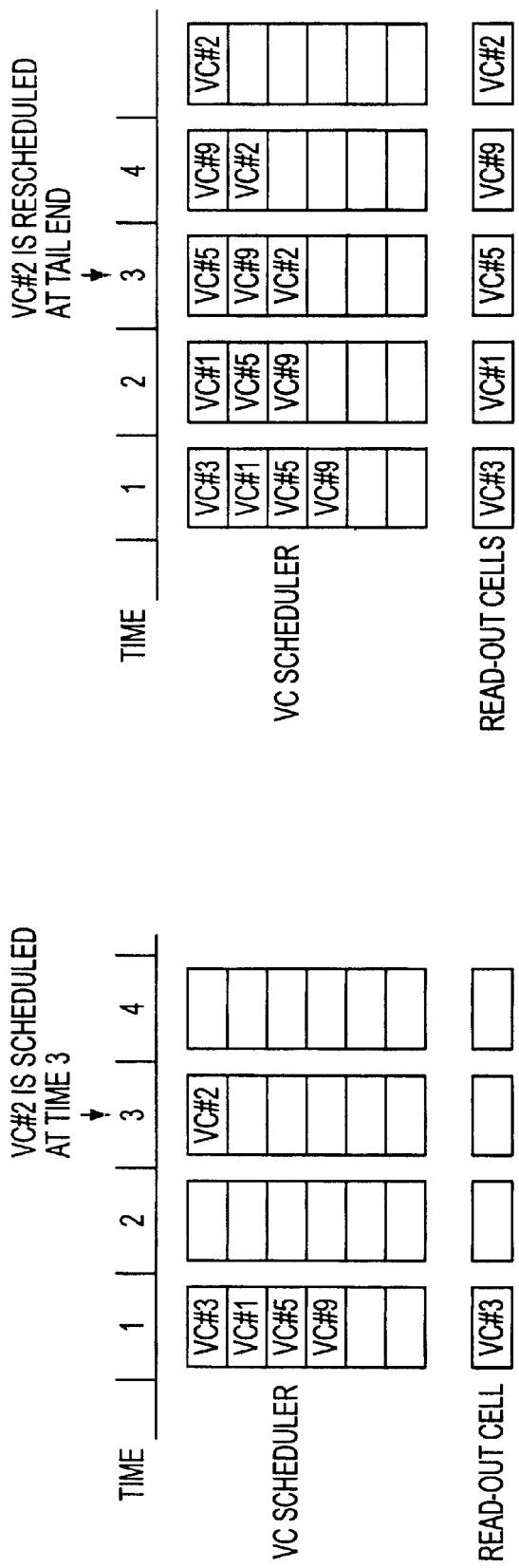
FIGS. 27A and 27B are diagrams explaining the action of a VC scheduler.

FIGS. 27A and 27B explain the action of the VC scheduler. Here, let us explain the processing in a case in which a plurality of cells are waiting to be sent at a given time.

In the situation shown in FIG. 27A, 4 VC numbers are stored in the scheduler corresponding to time 1; 1 VC number is stored in the scheduler corresponding to time 3. In this case, at time 1 the VC number stored at the start of the scheduler corresponding to time 1 is read out. That is to say, "#3" is read out. Then the remaining VC numbers ("#1", "#5" and "#9"), which were originally anticipated to be sent a cell at time 1, are shifted to the scheduler corresponding to time 2, and processed at time 2.

At time 2, when "#1" is read out from the corresponding scheduler, "#5" and "#9" remain. These VC numbers are shifted to the scheduler corresponding to time 3, but a VC number "#2" is already stored in this scheduler. In a case such as this, as shown in FIG. 27B, the VC numbers that remain in a scheduler at a certain time are mapped to the scheduler for the next time, and the VC numbers that were already stored in that next scheduler are shunted behind that mapped VC numbers. In this example, "#5" and "#9" are stored from the start of the scheduler corresponding to time 3, in that order, and "#2" is stored after them.

When the VC number read-out sequence is controlled as described above, the ATM virtual connections can be treated on an equal footing. For example, in the example of FIGS. 27A and 27B, whereas the original anticipated sending times of "#5" and "#9" were time 1, the original anticipated sending time of "#2" was time 3. Consequently, if "#5" and "#9" were to be stored behind "#2", the delay in the ATM virtual connections corresponding to "#5" and "#9" would become even larger. If the order of specifying of VC numbers is determined by the method shown in FIGS. 27A and 27B, this kind of delay in a given ATM virtual connection can be minimized.

FIG. 28A shows the logical configuration of the memory area that is used to control the VC specification. The VC scheduler is configured so as to treat times as addresses. A "time" is a value generated by the timing counter shown in FIG. 28B; the count is incremented by 1 every time this short cell multiplexing device outputs an ATM cell. "HEAD" is the VC number stored at the start of the scheduler for each time or its storage address (the start address); "TAIL" is the VC number stored at the tail end of the scheduler corresponding to each time or its storage address (the last address); "CNT" indicates the number of VC numbers stored in the scheduler for each time.

The chain management table stores information that indicates the order in which the VC numbers are stored in the VC scheduler for a certain time. For example, if this chain management table is accessed with "VC=2" as a key, "4" is obtained; this means that "#4" is stored immediately after "#2" as a VC number. That is to say, in the example shown in FIG. 28A, the VC numbers are stored in the order "#2", "#4", "#1", "#5".

In FIG. 26A, the scheduler is shown conceptually in order to make the explanation of the action of the VC specification control section easier to understand, but an actual VC scheduler has the configuration shown in FIG. 28A.

Also, in FIG. 26B, the time management table and the cell interval management tables are shown, but in fact there are also setting and release flags for each ATM virtual connection, as shown in FIG. 28C. The setting and release flags are information that indicate whether or not the corresponding ATM virtual connection is presently being used.

Figure 29:
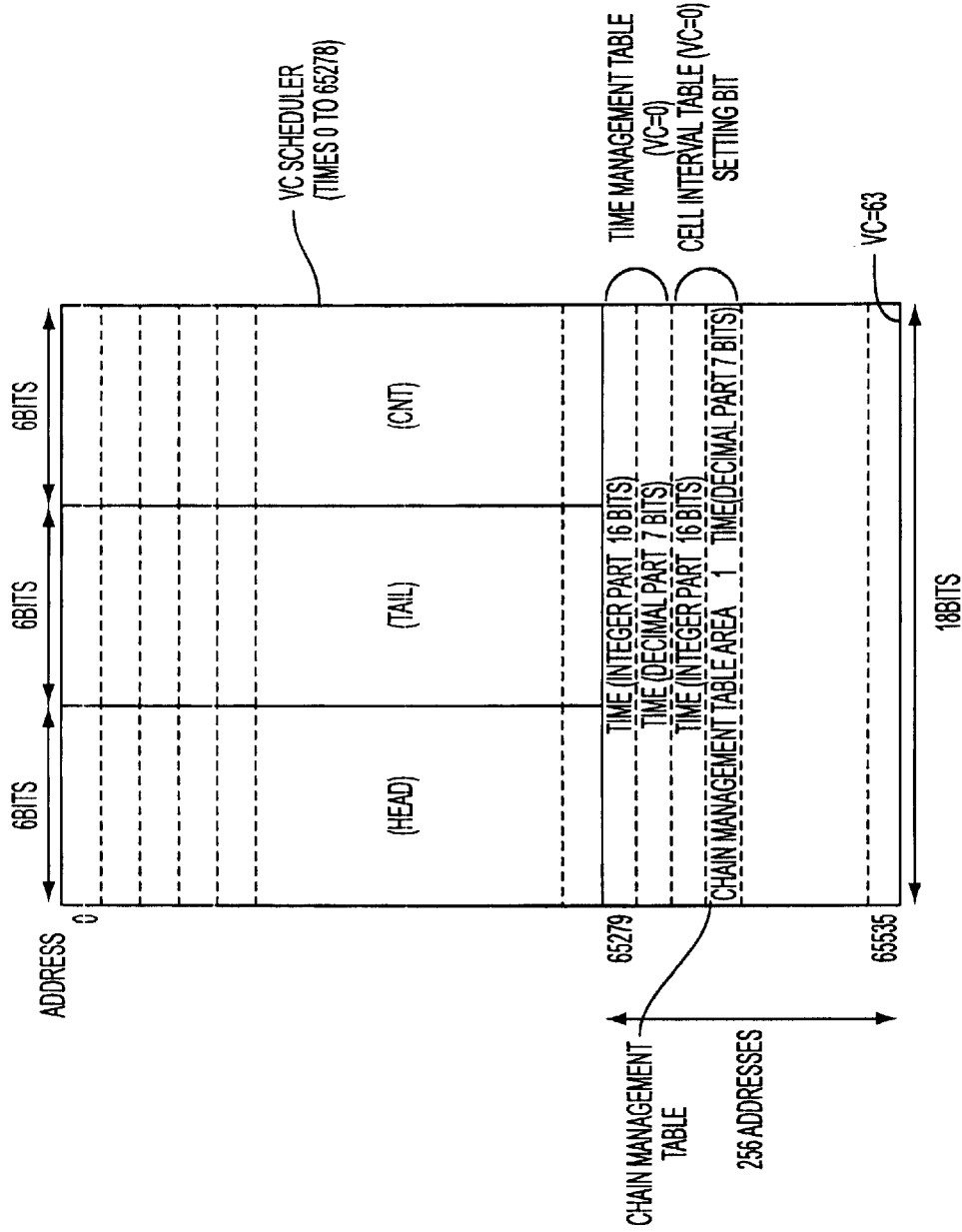
FIG. 29 shows one example of a specific memory configuration in the VC specification control section.

FIG. 29 shows one example of a specific memory configuration for the case in which the VC specification control section 46 executes method E described above.

Figure 30:
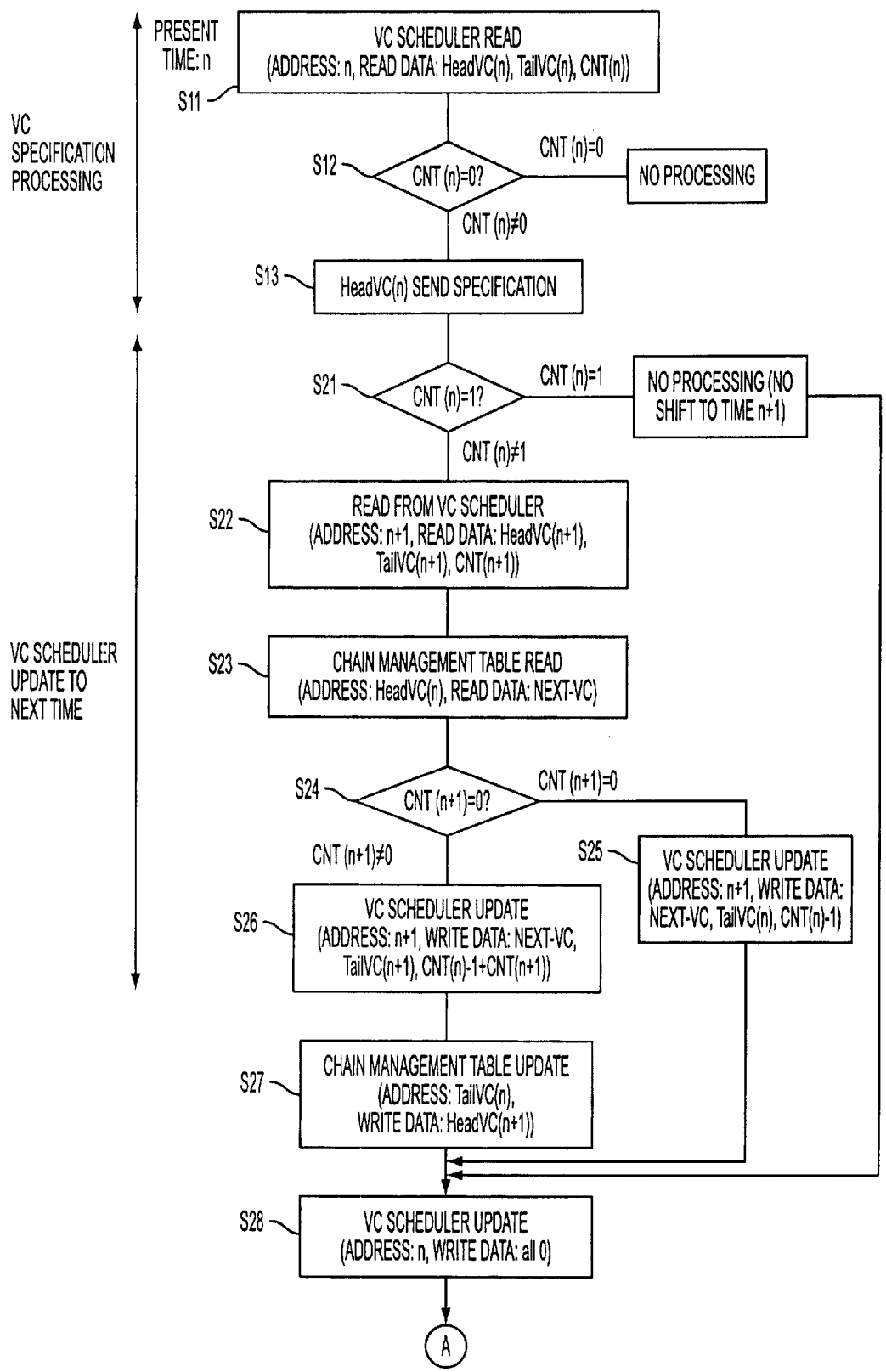
FIGS. 30 to 32 are flowcharts (#1 to #3) explaining the processing in the VC specification control section in the case when the VC number is specified according to method E.
Figure 31:
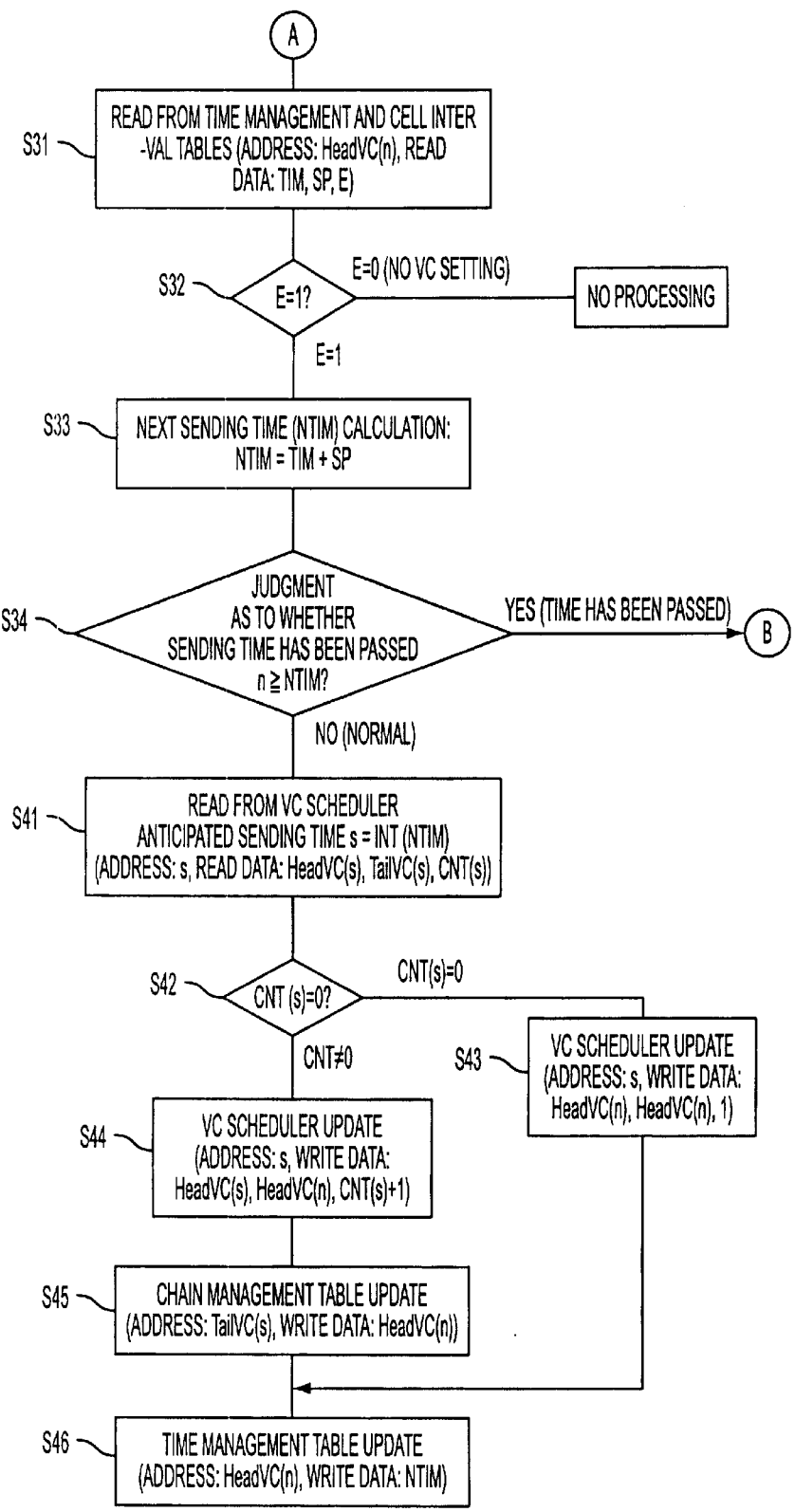
Figure 32:
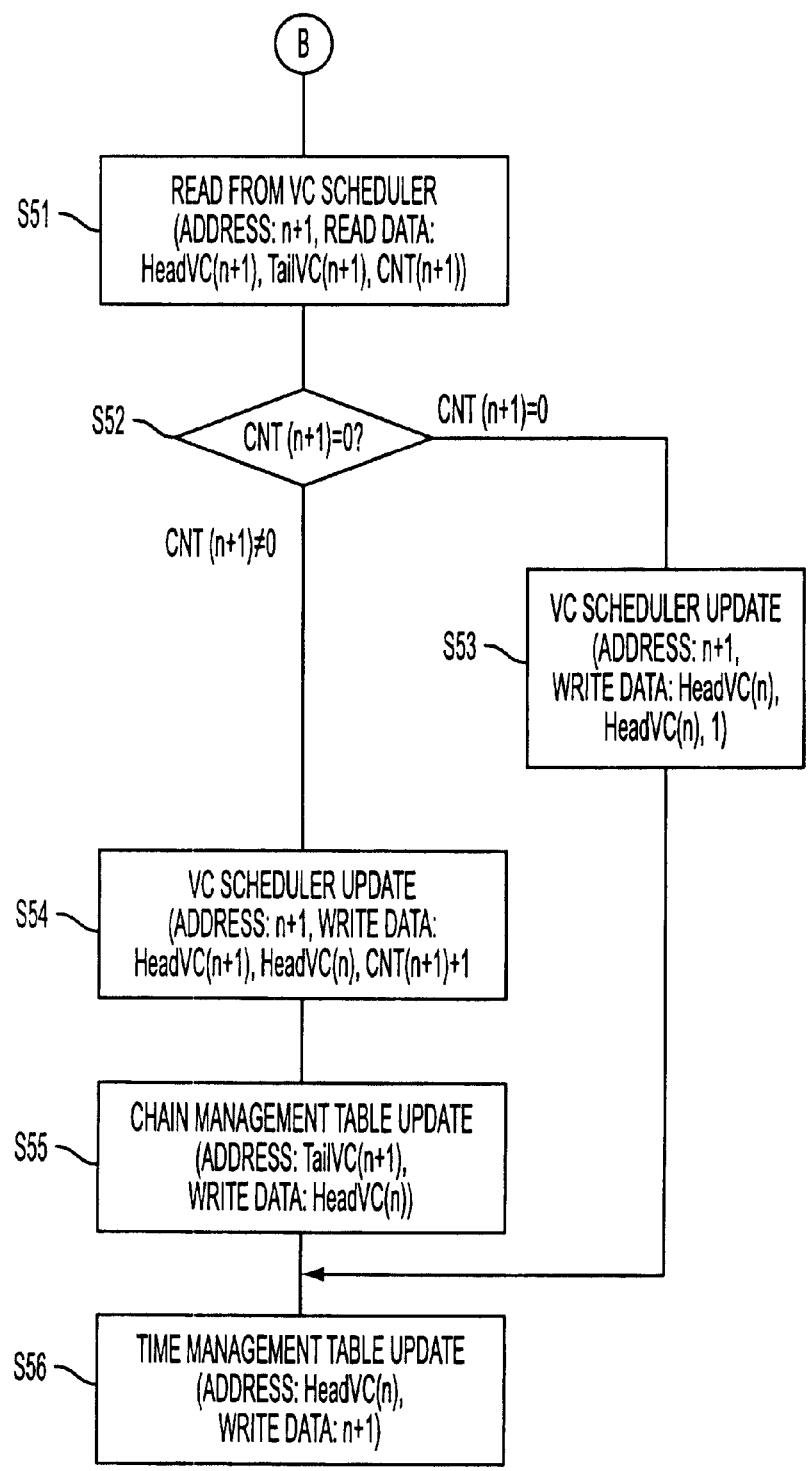

FIGS. 30 to 32 are flow charts that explain the processing in the VC specification control section 46 when the VC numbers are specified in accordance with the above method E. The processing in these flow charts is executed every time this short cell multiplexing device sends an ATM cell. The processing at time n will be explained below.

Steps S11 to S13 are the processing in which the VC number is specified. In step S11, the first VC number (HeadVC(n)), the last VC number (TailVC(n)) and the number of VC numbers that are stored (CNT(n)) are fetched from the VC scheduler corresponding to time n. In step S12, the system investigates whether or not the number of VC numbers that are stored is 0. If the number of VC numbers that are stored is not 0, the processing proceeds to step S13; if the number of VC numbers that are stored is 0, the processing ends without a VC number being specified at time n. In step S13, the first VC number that was read out in step S11 is specified as the VC number at time n.

The steps starting with step S21 are the processing that determines the anticipated time at which an ATM cell will be sent. In step S21, the system investigates whether or not the number of VC numbers that are stored is 1. If the number of VC numbers that are stored is not 1, that is to say, if the number of VC numbers that are stored is 2 or more, the processing proceeds to step S22; while if the number of VC numbers that are stored is 1, it means that there are no VC numbers to be shifted to time n+1, so steps S22 to S27 are skipped.

In step S22, the first VC number (HeadVC(n+1)), the last VC number (TailVC(n+1)) and the number of VC numbers that are stored (CNT(n+1)) are read out from the scheduler corresponding to time n+1. In step S23, with the first VC number that was read out in step S11 as a key the next VC number (NEXT-VC) is read out from the chain management table. In step S24, the system investigates whether or not the number of VC numbers that are stored at time n+1 is 0.

If the number of VC numbers that are stored at time n+1 is 0, then, in step S25, the VC scheduler corresponding to time n+1 is updated as follows. HeadVC(n+1) is replaced by NEXT-VC; TailVC(n+1) is replaced by TailVC(n); and CNT(n+1) is replaced by CNT(n)−1. Meanwhile, if the number of VC numbers that are stored at time n+1 is not 0, then, in step S26, the VC scheduler corresponding to time n+1 is updated as follows. HeadVC(n+1) is replaced by NEXT-VC; TailVC(n+1) is replaced by TailVC(n+1); and CNT(n+1) is replaced by CNT(n)−1+CNT(n+1). Then, in step S27, with the tail-end VC number at time n as a key, the chain management table is updated as follows. NEXT-VC is replaced by HeadVC(n+1). In step S28, in order to clear unnecessary data that remain at time n, all of the values in the VC scheduler at time n are updated to 0.

In step S31, with the first VC number at time n as a key, the anticipated sending time (TIM) is read out from the time management table, and the interval datum (SP) and the setting/release flag (E) are read out from the cell interval management table. In step S32, the system investigates whether or not the setting/release flag that was read out in step S31 is in the set status (setting=1). If it is in the set status, the processing proceeds to step S33; if it is not in the set status, the processing ends without subsequent steps being executed.

In step S33, the anticipated time at which the next ATM cell should be sent (NTIM) onto the ATM connection corresponding to the VC number that was specified in the processing in steps S11 to S13 is computed. Specifically, NTIM=TIM+SP. In step S34, the system investigates whether the anticipated next sending time that was computed in step S33 is before or after the present time. If the anticipated next sending time is after the present time, the processing proceeds to step S41; if the anticipated next sending time is before the present time, the processing proceeds to step S51. In step S41, first, the value of the integer part of the anticipated next sending time (s) that was computed in step S33 is found. That is to say, s=INT(NTIM) is executed. Then the first VC number (Head(VC(s)), the last VC number (TailVC(s)) and the number of VC numbers that are stored (CNT(s)) are read out from the VC scheduler corresponding to that value. In step S42, the system investigates whether or not the number of VC numbers stored at time s is 0.

If the number of VC numbers stored at time s is 0, then, in step S43, the VC scheduler corresponding to time s is updated as follows. HeadVC(s) is replaced by HeadVC(n); TailVC(s) is replaced by HeadVC(n); and CNT(s) is replaced by 1. Meanwhile, if the number of VC numbers that are stored at time s is not 0, then, in step S44, the VC scheduler corresponding to time s is updated as follows. HeadVC(s) is replaced by HeadVC(s); TailVC(s) is replaced by HeadVC(n); and CNT(s) is replaced by CNT(s)+1. In step S45, with the tail-end VC number at time s as a key, the chain management table is updated as follows. NEXT-VC is replaced by HeadVC(n). Then, in step S46, with the head VC number at time n as a key, the time management table is updated as follows. TIM is replaced by NTIM.

Meanwhile, in step S51, the first VC number (HeadVC (n+1)), the last VC number (TailVC(n+1)) and the number of VC numbers that are stored (CNT(n+1)) are read out from the VC scheduler corresponding to time n+1. In step S52, the system investigates whether or not the number of VC numbers that are stored at time n+1 is 0.

If the number of VC numbers that are stored at time n+1 is 0, then, in step S53, the VC scheduler corresponding to time n+1 is updated as follows. HeadVC(n+1) is replaced by HeadVC(n); TailVC(n+1) is replaced by HeadVC(n); and CNT(n+1) is replaced by 1. Meanwhile, if the number of VC numbers that are stored at time n+1 is not 0, then, in step S54, the VC scheduler corresponding to time n+1 is updated as follows. HeadVC(n+1) is replaced by HeadVC(n+1); TailVC(n+1) is replaced by HeadVC(n); and CNT(n+1) is replaced by CNT(n+1)+1. In step S55, with the last Vc number at time n+1 as a key, the chain management table is updated as follows. NEXT-VC is replaced by HeadVC(n). Then, in step S56, with the first VC number at time n as a key, the time management table is updated as follows. TIM is replaced by n+1.

Figure 33:
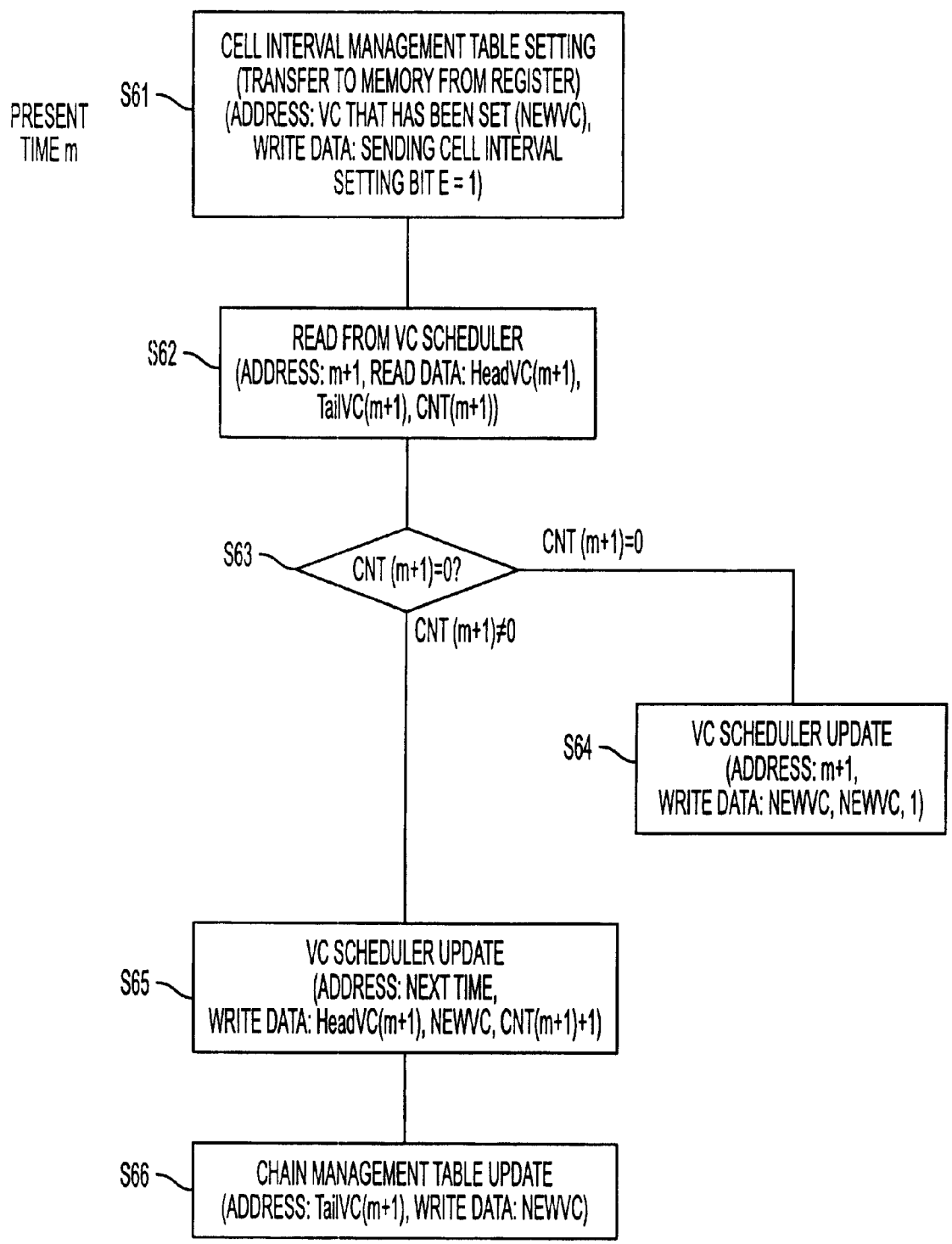
FIG. 33 is a flowchart explaining the processing that is executed by the VC specification control section when an ATM virtual connection is set.

FIG. 33 is a flow chart that explains the processing that is executed by the VC specification control section at the time when an ATM virtual connection is set. Here, the explanation will assume that the present time is time m.

In step S61, in the cell interval management table, with the VC number that identifies the newly established ATM virtual connection (NEWVC) as a key, the cell sending interval for that ATM virtual connection is set. In addition, the setting/release flag for the VC number corresponding to that ATM virtual connection is set to set status (E=1). In step S62, the first VC number (HeadVC(m+1)), the last VC number (TailVC(m+1)) and the number of VC numbers that are stored (CNT(m+1)) are read out from the VC scheduler corresponding to time m+1. In step S63, the system investigates whether or not the number of VC numbers that are stored at time m+1 is 0.

If the number of VC numbers that are stored at time m+1 is 0, then, in step S64, the VC scheduler corresponding to time m+1 is updated as follows. HeadVC(m+1) is replaced by NEWVC; TailVC(m+1) is replaced by NEWVC; and CNT(m+1) is replaced by 1. Meanwhile, if the number of VC numbers that are stored at time m+1 is not 0, then, in step S65, the VC scheduler corresponding to time m+1 is updated as follows. HeadVC(m+1) is replaced by HeadVC(m+1); TailVC(m+1) is replaced by NEWVC; and CNT(m+1) is replaced by CNT(m+1)+1. Then, in step S66, with the last VC number at time m+1 as a key, the chain management table is updated as follows. NEXT-VC is replaced by NEWVC.

In the embodiment described above, memory was used for the purpose of storing and holding various types of setting information, but it is also possible to use means of latching such as flip-flops or registers. Further, regarding the buffers used to store short cells, it is sufficient for them to be logically partitioned into each ATM virtual connection (VC) and each quality class; this can be achieved in a shared memory configuration. Use of a shared memory configuration increases the efficiency of memory use and reduces the amount of multiplexing unit hardware.

In the embodiment described above, the case of AAL type 2 short cells was described, but the "short cells" used in this invention need not be limited to AAL type 2; other forms of packets, in particular variable length packets, are also included.

According to this invention, in a device in which a plurality of short cell connections are multiplexed into one ATM connection, it has been made possible to consolidate the handling of a plurality of ATM connections, and the efficiency of multiplexing is improved. In addition, as a result, it has been made possible to hold the cost of the short cell multiplexing device itself down.

What is claimed is:

1. A short cell multiplexing device which accommodates a plurality of virtual connections established on a fixed length packet transmission network, and multiplexes short cells in the plurality of virtual connections, comprising:

identifying means for identifying a virtual connection to which a received short cell is to be sent;

storing means for storing the received short cell based on the virtual connection identified by said identifying means;

specifying means for specifying a virtual connection order for sending fixed length packets to the plurality of virtual connections in accordance with a predetermined algorithm;

reading means for reading a short cell out from said storing means based on the virtual connection order specified by said specifying means; and means for storing the short cell read out by said reading means in a fixed length packet, and for sending the fixed length packet to the virtual connection identified by said identifying means and based on the order specified by said specifying means.

2. The short cell multiplexing device according to claim 1, wherein said storing means consists of a plurality of FIFO memories provided for each virtual connection of the plurality of virtual connections; and said reading means reads one or more short cells out from the FIFO memory corresponding to the virtual connection order specified by said specifying means until a payload of the fixed length packet that is to be sent is filled.

3. The short cell multiplexing device according to claim 1, wherein said storing means is shared by a plurality of virtual connections.

4. A short cell multiplexing device which accommodates a plurality of virtual connections established on a fixed length packet transmission network, and multiplexes short cells in the plurality of virtual connections, comprising:

identifying means for identifying a virtual connection to which a received short cell is to be sent, and a quality class to which the short cell belongs;

storing means, that is partitioned into an area for each virtual connection of the plurality of virtual connections and each quality class of a plurality of quality classes, for storing the received short cell in an area specified according to the virtual connection and the quality class identified by said identifying means;

specifying means for specifying a virtual connection order for sending fixed length packets to the plurality of virtual connections in accordance with a predetermined algorithm;

quality class specifying means for specifying a quality class order from among the plurality of quality classes in accordance with a predetermined algorithm;

reading means for reading a short cell out from an area within said storing means corresponding to the virtual connection order specified by said specifying means and the quality class order specified by said quality class specifying means; and means for storing the short cell read out by said reading means in a fixed length packet, and for sending the fixed length packet to the virtual connection identified by said identifying means and based on the order specified by said specifying means.

5. A short cell multiplexing device which accommodates a plurality of virtual connections established on a fixed length packet transmission network, and multiplexes short cells in the plurality of virtual connections, comprising:

identifying means for identifying a virtual connection to which a received short cell is to be sent;

storing means for storing the received short cell based on the virtual connection identified by said identifying means;

specifying means for specifying a virtual connection order from among the plurality of virtual connections in accordance with a predetermined algorithm;

reading means for reading a short cell out from said storing means based on the virtual connection order specified by said specifying means; and means for storing the short cell read out by said reading means in a fixed length packet, and for sending the fixed length packet to the virtual connection identified by said identifying means and based on the order specified by said specifying means, wherein a sending interval is predetermined for each virtual connection of the plurality of virtual connections which is an interval between when fixed length packets are sent to the plurality of virtual connections, respectively; and said specifying means has a plurality of counters that count a time elapsed from a time at which a previous fixed length packet was sent for a corresponding virtual connection, and, when the elapsed time counted by a certain counter among the counters reaches the sending interval that has been set for a virtual connection corresponding to that counter, said specifying means specifies that virtual connection.

6. The short cell multiplexing device according to claim 5, wherein an order of priority is assigned to the plurality of virtual connections; and when the elapsed times counted by the plurality of counters, respectively, reach the sending intervals for the virtual connections corresponding to each of those respective counters, said specifying means specifies one of those virtual connections in accordance with the order of priority.

7. A short cell multiplexing device which accommodates a plurality of virtual connections established on a fixed length packet transmission network, and multiplexes short cells in the plurality of virtual connections, comprising:

identifying means for identifying a virtual connection to which a received short cell is to be sent;

storing means for storing the received short cell based on the virtual connection identified by said identifying means;

specifying means for specifying a virtual connection order from among the plurality of virtual connections in accordance with a predetermined algorithm;

reading means for reading a short cell out from said storing means based on the virtual connection order specified by said specifying means; and means for storing the short cell read out by said reading means in a fixed length packet, and for sending the fixed length packet to the virtual connection identified by said identifying means and based on the order specified by said specifying means, wherein initial read-out credits are assigned to the plurality of virtual connections, respectively; and said specifying means specifies a virtual connection that has the largest read-out credit, subtracts 1 from the read-out credit corresponding to the specified virtual connection, and if all of the read-out credits corresponding to the plurality of virtual connections have fallen to or below a certain threshold, adds the initial read-out credits to a present read-out credit, respectively.

8. The short cell multiplexing device according to claim 7, wherein said specifying means stores a virtual connection which is specified by an immediately preceding specifying process, and when a plurality of read-out credits are equal to or greater than the threshold, said specifying means specifies a virtual connection other than the stored virtual connection from among the plurality of virtual connections.

9. The short cell multiplexing device according to claim 7, wherein the threshold is 0.

10. A short cell multiplexing device which accommodates a plurality of virtual connections established on a fixed length packet transmission network, and multiplexes short cells in the plurality of virtual connections, comprising:

identifying means for identifying a virtual connection to which a received short cell is to be sent;

storing means for storing the received short cell based on the virtual connection identified by said identifying means;

specifying means for specifying a virtual connection order from among the plurality of virtual connections in accordance with a predetermined algorithm;

reading means for reading a short cell out from said storing means based on the virtual connection order specified by said specifying means; and means for storing the short cell read out by said reading means in a fixed length packet, and for sending the fixed length packet to the virtual connection identified by said identifying means and based on the order specified by said specifying means, wherein a fixed length packet sending interval is assigned to each virtual connection of the plurality of virtual connections, respectively; and said specifying means computes an anticipated time at which a next fixed length packet is to be sent for each of the respective virtual connections based on the assigned fixed length packet sending interval, and specifies a virtual connection for which a present time has reached that anticipated time.

11. The short cell multiplexing device according to claim 10, wherein
an order of priority is assigned to the plurality of virtual connections; and
if the present time has reached the anticipated time for a plurality of virtual connections, said specifying means specifies one from among those virtual connections in accordance with the order of priority assigned to the plurality of virtual connection.

12. The short cell multiplexing device according to claim 11, wherein
if the present time has reached the anticipated time for a plurality of virtual connections, and in addition, those anticipated times are the same as each other, said specifying means specifies one of those virtual connections in accordance with the order of priority.

13. The short cell multiplexing device according to claim 10, wherein
if Bi is a band ratio assigned to a virtual connection i among the plurality of virtual connections, the fixed length packet sending interval for the virtual connection i is given by $(1-Bi)/Bi$.

14. The short cell multiplexing device according to claim 10, wherein
the fixed length packet sending interval for each of the plurality of virtual connections is given in units of the intervals at which the fixed length packets are sent on transmission paths established by the plurality of virtual connections, respectively.

15. The short cell multiplexing device according to claim 10, wherein
said specifying means has a counter that counts a number of the fixed length packets sent from said multiplexing device, and using absolute time given by a count value of said counter, finds the anticipated times at which the next fixed length packet is to be sent to each virtual connection.

16. The short cell multiplexing device according to claim 10, wherein
for each virtual connection, said specifying means finds the anticipated time at which the next fixed length packet is to be sent, using a relative time determined by an actual time at which a certain fixed length packet is sent, the anticipated sending time of that fixed length packet, and the fixed length packet sending interval.

17. A short cell multiplexing device which accommodates a plurality of virtual connections established on a fixed length packet transmission network, and multiplexes short cells in the plurality of virtual connections, comprising:
identifying means for identifying a virtual connection to which a received short cell is to be sent;
storing means for storing the received short cell based on the virtual connection identified by said identifying means;
specifying means for specifying a virtual connection order from among the plurality of virtual connections in accordance with a predetermined algorithm;
reading means for reading a short cell out from said storing means based on the virtual connection order specified by said specifying means; and
means for storing the short cell read out by said reading means in a fixed length packet, and for sending the fixed length packet to the virtual connection identified by said identifying means and based on the order specified by said specifying means, wherein said specifying means includes:
a FIFO memory that stores an identification number of each virtual connection corresponding to a time:
means for reading out the identification number stored at a start of said FIFO memory corresponding to a present time, and for specifying the virtual connection corresponding to that read identification number;
means for computing an anticipated sending time of a next fixed length packet in the specified virtual connection, and for writing the identification number of that virtual connection into the FIFO memory corresponding to that anticipated sending time; and
means for writing the identification number that was not read out from the FIFO memory corresponding to the present time into the start or an end of the FIFO memory corresponding to a next time.

18. The short cell multiplexing device according to claim 17, wherein
when a computed anticipated sending time is before the present time, said specifying means writes the identification number of the virtual connection into the FIFO corresponding to the next time after the present time.

19. The short cell multiplexing device according to claim 17, wherein
said specifying means takes the anticipated sending time that was computed at a previous time as a reference time for time calculation.

20. The short cell multiplexing device according to claim 17, wherein
said FIFO memory comprises a plurality of chain memories established for each timing, and an order of stored identification numbers is defined by the plurality of chain memories.

21. The short cell multiplexing device according to claim 17, wherein said specifying means further includes:
a time counter that counts up every packet sending timing;
a scheduler table that stores a first address, a last address, and a number of pieces of information that are stored for each time;
a chain management table that stores a chain that expresses an order of stored information in said scheduler table;
a time management table that stores a next anticipated sending time for each virtual connection; and
an interval management table that stores a fixed length packet sending interval for each virtual connection.

22. A short cell multiplexer to multiplex variable length short cells into ATM cells, each ATM cell having different virtual connections, comprising:
a specification section to specify a virtual connection for sending an ATM cell, based on a set interval for each virtual connection, a designator to designate a variable length short cell which belong to any one of a plurality of classes based on set intervals per class;
a readout section to read variable length short cells from a buffer corresponding to the specified virtual connection; and
a multiplexer to multiplex variable length short cells read by the readout section into the ATM cell specified by the specification section.

23. A short cell multiplexer to multiplex variable length short cells, which belong to any one of a plurality of classes, into ATM cells, each ATM cell having different virtual connections, comprising:

- a specification section to specify a virtual connection for sending an ATM cell, based on set intervals for each virtual connection;
- a designator to designate a variable length short cell which belong to any one of a plurality of classes based on set intervals per class;
- a readout section to read variable length short cells from a buffer corresponding to the specified virtual connection and designated class; and
- a multiplexer to multiplex variable length short cells read by the readout section into the ATM cell specified by the specification section;
- the variable length short cell being multiplexed into the ATM cell which has the virtual connection specified by the specification section.

24. A short cell multiplexer to multiplex variable length short cells which belong to any one of a plurality of classes into ATM cells, each ATM cell having different virtual connections, comprising:

- a specification section to specify a virtual connection for sending an ATM cell, based on a set interval for each virtual connection;
- a designator to designate a class of the variable length short cell to read next time based on the class and a length of the variable length short cell to have been read last time,
- a readout section to read variable length short cells from a buffer corresponding to the specified virtual connection and designated class; and
- a multiplexer to multiplex variable length short cells read by the readout section into the ATM cell specified by the specification section.

25. A short cell multiplexer to multiplex variable length short cells which belong to any one of a plurality of classes into ATM cells, each ATM cell having different virtual connections, comprising:

- a specification section to specify a virtual connection for sending an ATM cell based on a set interval for each virtual connection;
- a calculator to calculate reading timing of a variable length short cell of each class based on a length of the variable length short cell which belong to the same class of that class to have been read last time,
- a readout section to read variable length short cells from a buffer corresponding to the specified virtual connection and based on the calculated reading timing; and
- a multiplexer to multiplex variable length short cells read by the readout section into the ATM cell specified by the specification section.

26. The short cell multiplexer of claim 25, further comprising:

- a designator to designate a class of the variable length short cell to read next time based on the class and a length of the variable length short cell to have been read last time,
- wherein the readout section further reading the variable length short cell corresponding to the designated class.

* * * * *